US011258928B2

(12) United States Patent
Hamada et al.

(10) Patent No.: US 11,258,928 B2
(45) Date of Patent: Feb. 22, 2022

(54) WEARABLE CAMERA

(71) Applicant: PANASONIC I-PRO SENSING SOLUTIONS CO., LTD., Fukuoka (JP)

(72) Inventors: Junichi Hamada, Fukuoka (JP); Shinichi Murata, Fukuoka (JP); Yu Jojima, Fukuoka (JP); Noboru Takada, Fukuoka (JP); Masashi Nakamura, Fukuoka (JP); Koji Taniguchi, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 57 days.

(21) Appl. No.: 16/777,322

(22) Filed: Jan. 30, 2020

(65) Prior Publication Data

US 2020/0412918 A1 Dec. 31, 2020

(30) Foreign Application Priority Data

Jun. 28, 2019 (JP) .............................. JP2019-122356

(51) Int. Cl.
*H04N 5/225* (2006.01)
*G03B 17/56* (2021.01)
*H01M 50/20* (2021.01)
*H01M 50/543* (2021.01)

(52) U.S. Cl.
CPC ......... *H04N 5/2252* (2013.01); *G03B 17/561* (2013.01); *H01M 50/20* (2021.01); *H01M 50/543* (2021.01); *G03B 2217/002* (2013.01)

(58) Field of Classification Search
CPC ............................. H04N 5/2252; H02J 7/0044
See application file for complete search history.

(56) References Cited

U.S. PATENT DOCUMENTS

| 2003/0148798 | A1* | 8/2003 | Asakura | ................ | H02J 7/0044 |
| | | | | | 455/573 |
| 2008/0235980 | A1* | 10/2008 | Chasen | ................... | B05B 3/001 |
| | | | | | 34/91 |
| 2012/0104992 | A1* | 5/2012 | Suzuki | .................. | H01M 10/46 |
| | | | | | 320/103 |
| 2018/0131847 | A1* | 5/2018 | Kokonaski | ......... | H04N 5/23293 |
| 2018/0167537 | A1 | 6/2018 | Takada et al. | | |
| 2019/0208765 | A1* | 7/2019 | D'Acquisto | ......... | A01K 29/005 |

FOREIGN PATENT DOCUMENTS

JP 2018-98571 A 6/2018

\* cited by examiner

*Primary Examiner* — Noam Reisner
(74) *Attorney, Agent, or Firm* — Seed IP Law Group LLP

(57) ABSTRACT

A wearable camera includes a capturing portion configured to capture a subject around a user, a control portion configured to control capturing processing of the capturing portion and charging processing of a battery, an upper housing that is mountable to the user and accommodates the capturing portion and the control portion, and a lower housing that accommodates the battery for supplying power to the upper housing, is detachably attached to the upper housing, and has a contact terminal which is exposed to an outside and is used for charging the battery, wherein the lower housing is configured to be connected to a charging stand via the contact terminal such that the battery is charged in a state where the lower housing is attached to the upper housing.

11 Claims, 18 Drawing Sheets

FIG. 14

| TRANSMISSION DATA | DESTINATION | COMMUNICATION MEANS | REMARKS |
|---|---|---|---|
| LIVE DATA | HEADQUARTERS | LTE | SEND VIA POLICE CAR : POLICE CAR FROM BWC IS WIRELESS LAN. LTE FROM POLICE CAR |
|  | VIA CLOUD | LTE | SEND VIA POLICE CAR : POLICE CAR FROM BWC IS WIRELESS LAN. LTE FROM POLICE CAR |
|  | MOBILE PHONE | WIRELESS LAN |  |
|  | MOBILE PHONE | BLE |  |
|  | POLICE CAR (IN-VEHICLE RECORDER) | WIRELESS LAN |  |
|  | POLICE CAR (PC) | WIRELESS LAN |  |
| RECORDED DATA | HEADQUARTERS | LTE | SEND VIA POLICE CAR . POLICE CAR FROM BWC IS WIRELESS LAN. LTE FROM POLICE CAR |
|  | VIA CLOUD | LTE | SEND VIA POLICE CAR . POLICE CAR FROM BWC IS WIRELESS LAN. LTE FROM POLICE CAR |
|  | MOBILE PHONE | WIRELESS LAN |  |
|  | MOBILE PHONE | BLE |  |
|  | POLICE CAR (IN-VEHICLE RECORDER) | WIRELESS LAN |  |
|  | POLICE CAR (PC) | WIRELESS LAN |  |
| METADATA | HEADQUARTERS | LTE | SEND VIA POLICE CAR : POLICE CAR FROM BWC IS WIRELESS LAN. LTE FROM POLICE CAR |
|  | VIA CLOUD | LTE | SEND VIA POLICE CAR . POLICE CAR FROM BWC IS WIRELESS LAN. LTE FROM POLICE CAR |
|  | MOBILE PHONE | WIRELESS LAN |  |
|  | MOBILE PHONE | BLE |  |
|  | POLICE CAR (IN-VEHICLE RECORDER) | WIRELESS LAN |  |
|  | POLICE CAR (PC) | WIRELESS LAN |  |

WEARABLE CAMERA

BACKGROUND OF THE INVENTION

1. Field of the Invention

The present disclosure relates to a wearable camera.

2. Background Art

For example, a wearable camera used to support a work of a police officer or a security guard is mounted to clothes worn by a user such that a field of view from a location close to a viewpoint of the user, such as a chest of the police officer, is captured (see, for example, JP-A-2018-98571). The wearable camera houses a battery for supplying power to each portion such as an electronic component built therein. The battery is configured by, for example, a rechargeable secondary battery. The wearable camera is charged by setting the housing on the charger and by connecting a contact terminal of the housing to a charging contact point of the charger.

However, a wearable camera of related art such as JP-A-2018-98571 has a battery housed in a housing, and charging is performed after a contact terminal exposed outside the housing is connected to a charging contact point of a charger, and thereby, a user such as a police officer or a security guard cannot carry and use the battery until charging is completed.

SUMMARY OF INVENTION

The present disclosure is devised in view of the above-described conventional situation and aims to provide a wearable camera that can avoid non-usage of a user based on restrictions on charging of a battery built in a housing and improve usability of the user. The present disclosure provides a wearable camera including a capturing portion configured to capture a subject around a user, a control portion configured to control capturing processing of the capturing portion and charging processing of a battery, an upper housing that is mountable to the user and accommodates the capturing portion and the control portion, and a lower housing that accommodates the battery for supplying power to the upper housing, is detachably attached to the upper housing, and has a contact terminal which is exposed to an outside and is used for charging the battery, wherein the lower housing is configured to be connected to a charging stand via the contact terminal such that the battery is charged in a state of where the lower housing is attached to the upper housing.

According to the present disclosure, it is possible to avoid non-usage of a user based on restrictions on charging of a battery built in a housing, and to improve usability of the user.

BRIEF DESCRIPTION OF THE DRAWINGS

FIG. 14 is a table illustrating an example of communication means for each transmission data.

DETAILED DESCRIPTION OF THE EXEMPLARY EMBODIMENT

Hereinafter, an embodiment that specifically discloses a wearable camera according to the present disclosure will be described in detail with reference to the drawings as appropriate. However, more detailed description than necessary may be omitted. For example, detailed description on well-known matters and repeated description on substantially the same configuration may be omitted. This is to avoid the following description from becoming unnecessarily redundant and to facilitate understanding by those skilled in the art. The accompanying drawings and the following description are provided to enable those skilled in the art to fully understand the present disclosure and are not intended to limit the subject matter described in claims.

Figure 1:
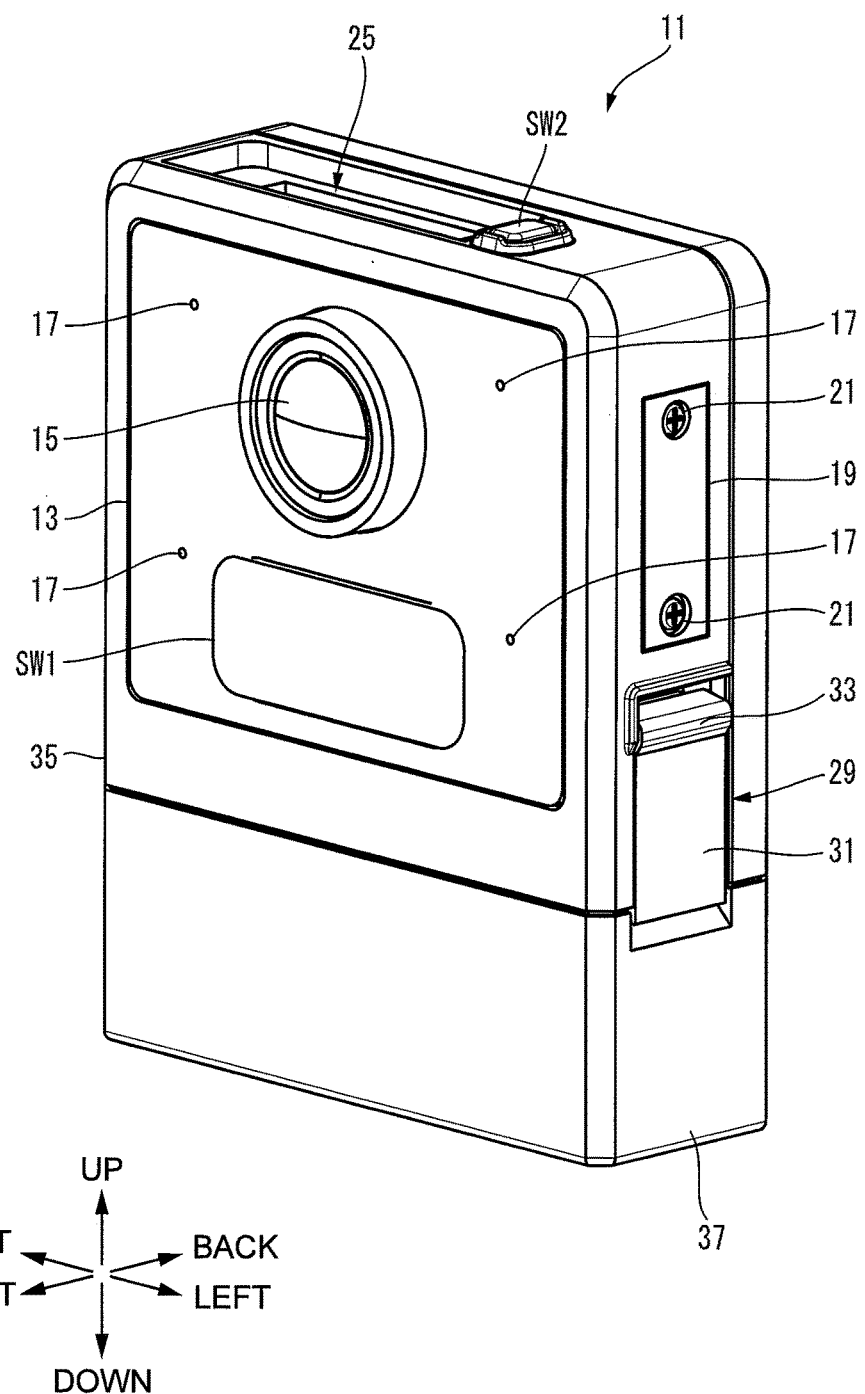
FIG. 1 is a perspective view illustrating an appearance of a wearable camera according to Embodiment 1.

FIG. 1 is a perspective view illustrating an appearance of a wearable camera 11 according to a first embodiment. In the present specification, upper, lower, front, rear, left, and right directions are indicated by arrows in FIG. 1, respectively. The wearable camera 11 according to the first embodiment is used by a police officer as an example of a user. The wearable camera 11 images a situation around (for example, the front) the police officer during patrol so as to store as a still image (image) or a moving image (video) and accumulates as data. The data can be transmitted to a server device (for example, a back-end server), for example, in a police station. A user of the wearable camera 11 is not limited to a police officer, and the wearable camera may be used by a security person of various other business establishments (for example, a security company).

The wearable camera 11 is used by being mounted to clothes (for example, a uniform worn by the police officer) worn by the police officer or a body so as to image a surrounding (for example, front) subject from a location close to the police officer's viewpoint, such as a police officer's chest. With the mounted wearable camera 11, the police officer operates an image recording switch SW1 to image the surrounding subject.

In the wearable camera 11, a front panel 13 having a substantially rectangular shape (including a square shape) is fixed to a front surface of the substantially rectangular parallelepiped housing whose front-rear direction is thin. An imaging lens 15 configuring an imaging unit, the image recording switch SW1, and a plurality (for example, four) of microphones 17 are arranged on the front panel 13. The microphone 17 is configured by, for example, an ECM microphone (electret capacitor microphone). As the image recording switch SW1 is, for example, shortly pushed by the police officer, recording (in other words, recording of a imaged moving image) starts, and as the recording switch is, for example, pushed longways, the recording (see above) ends. A USB cap 19 is detachably attached to the left side surface of the housing by a pair of upper and lower cap attaching screws 21. The USB cap 19 covers a USB interface which will be described below.

Figure 2:
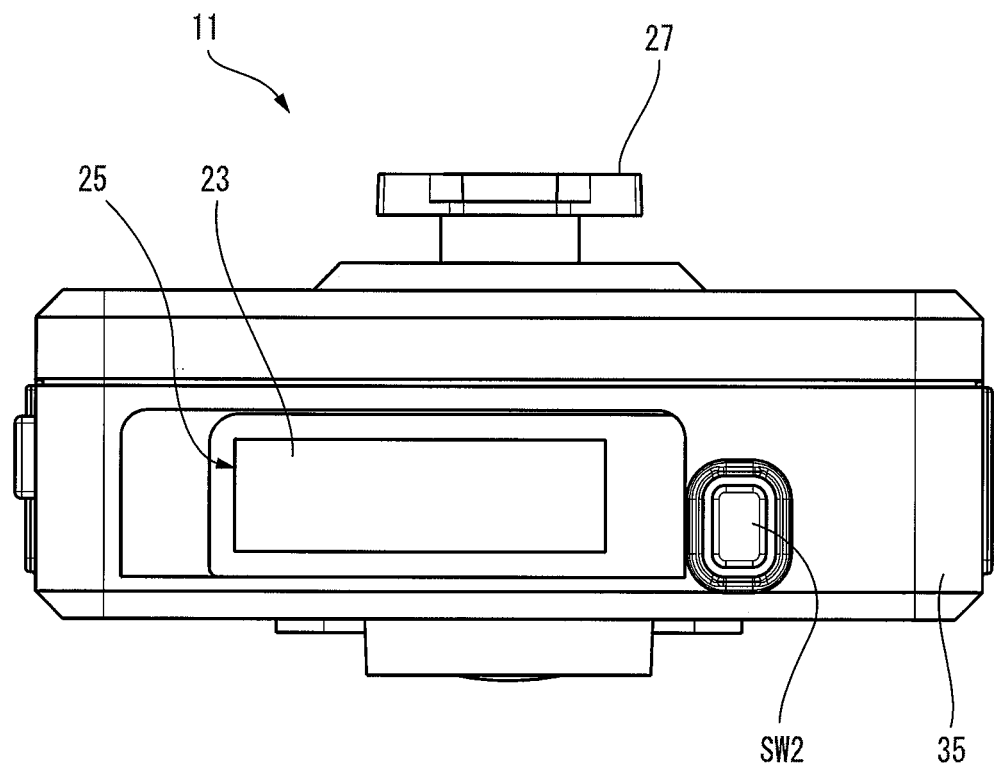
FIG. 2 is a plan view of the wearable camera illustrated in FIG. 1.

FIG. 2 is a plan view of the wearable camera 11 illustrated in FIG. 1. A display panel 25 using an LCD 23 is provided on an upper surface of the housing. A snapshot switch SW2 is provided in the vicinity of the display panel 25. Each time the snapshot switch SW2 is pushed by a police officer, a still image is captured at that time. A stud 27, which is used when being mounted to clothes, is provided on a rear surface of the housing so as to protrude rearward. The stud 27 can be easily engaged and disengaged with respect to a clip (not illustrated) attached to the clothes.

Figure 3:
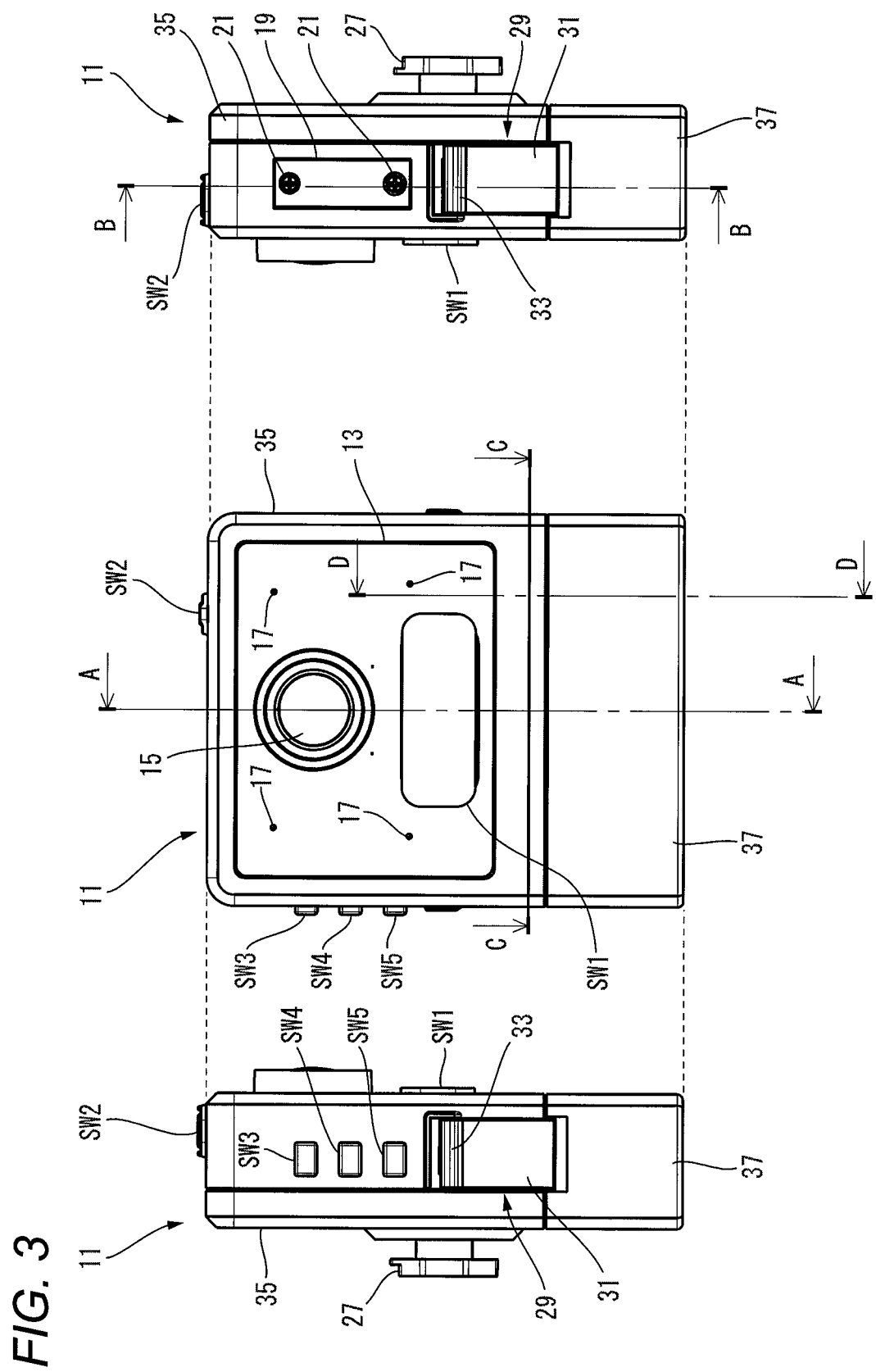
FIG. 3 is an external view illustrating a front surface view, a right side surface view, and a left side surface view of the wearable camera illustrated in FIG. 1.

FIG. 3 is an external view illustrating a front surface view, a right side surface view, and a left side surface view of the wearable camera 11 illustrated in FIG. 1. The wearable camera 11 is provided with a communication mode switch SW3, an attribute information assignment switch SW4, and a wireless registration switch SW5 from the upper side on the right side surface of the housing. In the wearable camera 11, a main locking hook 31 configuring a main locking portion 29 is provided on each of the left and right side surfaces. The main locking hook 31 is formed in a rectangular plate shape that is long in a vertical direction. A push projection portion 33 is formed on an upper outer surface of the main locking hook 31. The main locking hooks 31 on the left and right have lower ends which are swung outward by pushing each of the push projection portion 33.

The housing of the wearable camera 11 includes an upper housing 35 and a lower housing 37. The lower housing 37 is smaller than the upper housing 35 and is formed in a rectangular parallelepiped shape that is long in a horizontal direction. The lower housing 37 is detachably attached to a lower surface of the upper housing 35. The lower housing 37 can be detached from the upper housing 35 by unlocking a locking portion (see below). The locking portion is configured with, for example, the main locking portion 29 and a temporary locking portion 39 and can be locked by a double locking mechanism. Even if the main locking hook 31 of the main locking portion 29 is swung, the locking portion holds the lower housing 37 in a state being attached to the upper housing 35 unless the temporary locking portion 39 is released. Details of the locking portion will be described below.

Figure 4:
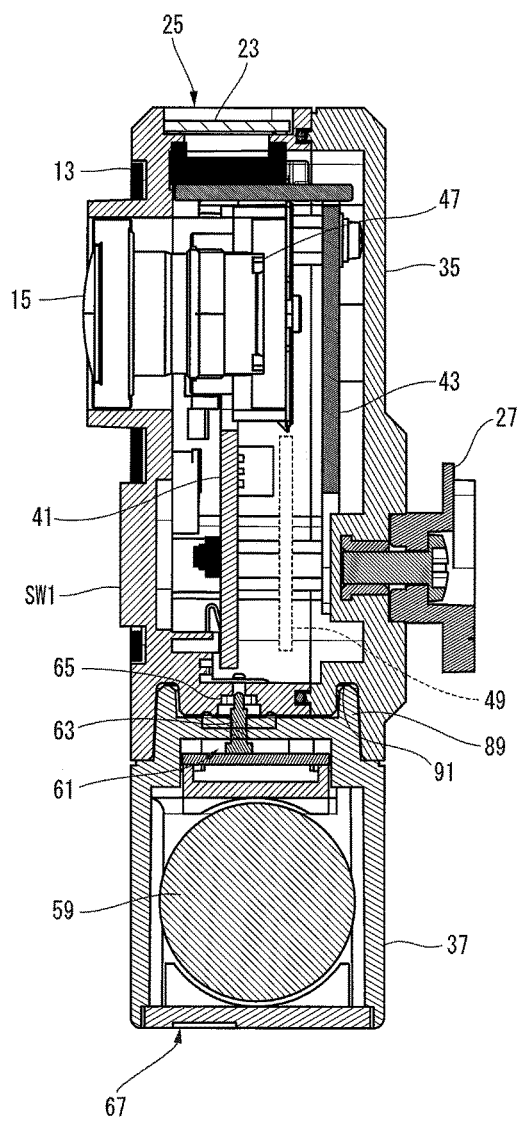
FIG. 4 is a sectional view taken along the line A-A of FIG. 3.

FIG. 4 is a sectional view taken along the line A-A of FIG. 3. In the upper housing 35, a first printed circuit board 41 and a second printed circuit board 43 are housed in parallel in a front-rear direction. A wireless LAN device 45 that configures a WLAN communication unit that functions as a wireless (local area network (LAN) and a BLE communication unit that functions as Bluetooth (registered trademark) low energy that is a short-range wireless communication unit is mounted on the first printed circuit board 41 as one chip. The wireless LAN device 45 may be mounted on the second printed circuit board 43. The upper housing 35 houses an imaging unit 47 including a charge coupled device (CCD) and the like. Further, either the first printed circuit board 41 or the second printed circuit board 43 is provided with a micro control unit (MCU) as a control unit that controls imaging processing of the imaging unit 47 and charging processing of a battery.

The wearable camera 11 can perform a wireless communication conforming to a long term evolution (LTE) as an example of a standard of a wide-area wireless communication using a cellular phone network. In this case, the wearable camera 11 optionally includes an LTE printed circuit board 49 on which an LTE device configuring the wide-area network communication unit is mounted between the first printed circuit board 41 and the second printed circuit board 43.

Figure 5:
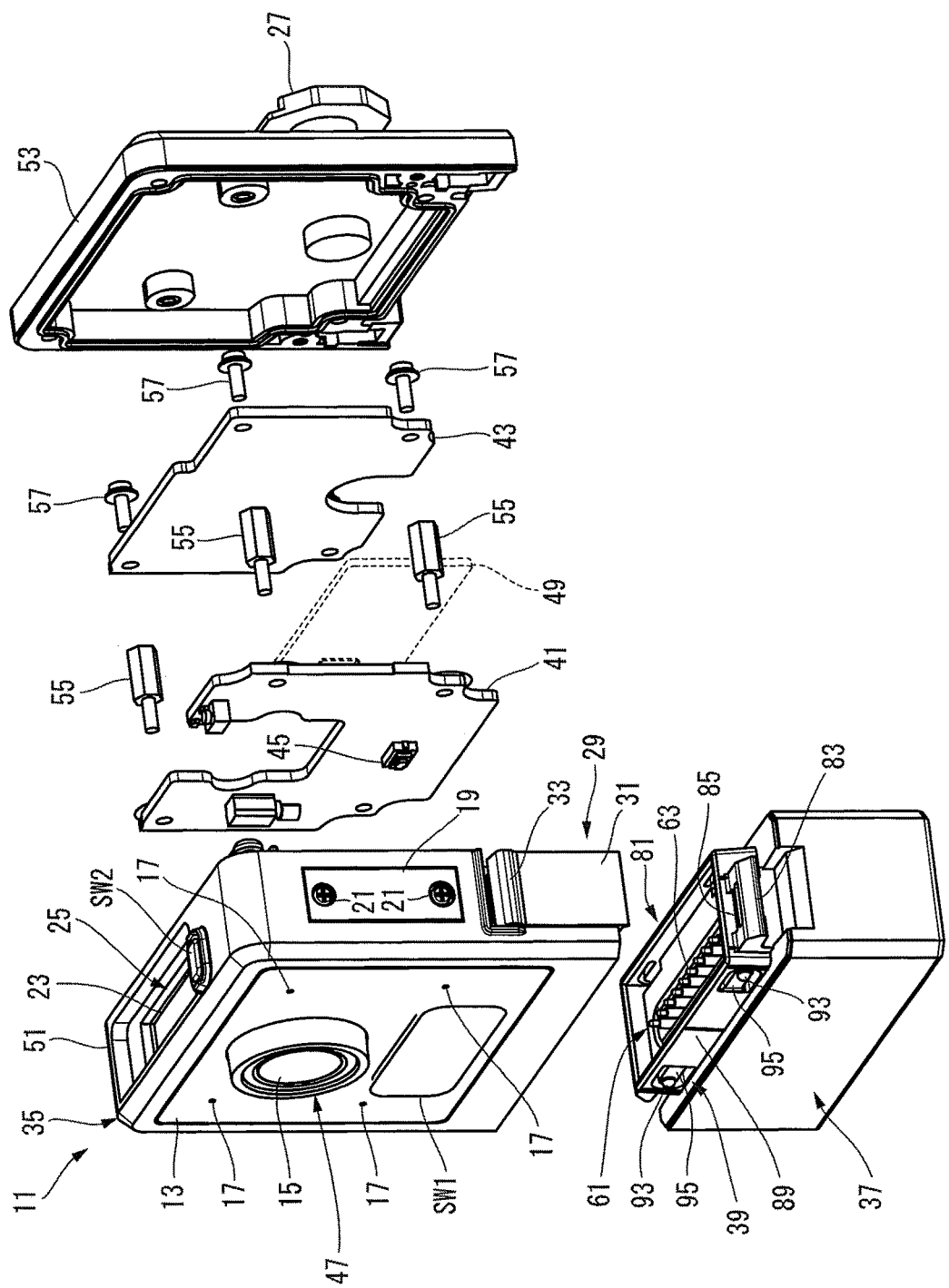
FIG. 5 is an exploded perspective view with an upper housing exploded.

FIG. 5 is an exploded perspective view in which the upper housing 35 is disassembled. The upper housing 35 housed the first printed circuit board 41 and the second printed circuit board 43 between a front case 51 and a rear case 53. Each of the first printed circuit board 41 and the second printed circuit board 43 is spaced apart at a predetermined interval via a plurality of stud bolts 55 and fixed to an inner side of the upper housing 35 by a board fixing bolt 57. Between the first printed circuit board 41 and the second printed circuit board 43, the LTE printed circuit board 49 serving as an option board is provided as necessary. The wearable camera 11 according to the first embodiment is included the LTE printed circuit board 49.

Accordingly, by providing the LTE printed circuit board 49 in the wearable camera 11, the upper housing 35 includes two wireless communication units of the first printed circuit board 41 and the LTE printed circuit board 49. In the first embodiment, one of the two wireless communication units is a WLAN communication unit and a BLE communication unit, and the other is a wide-area network communication unit.

Figure 6:
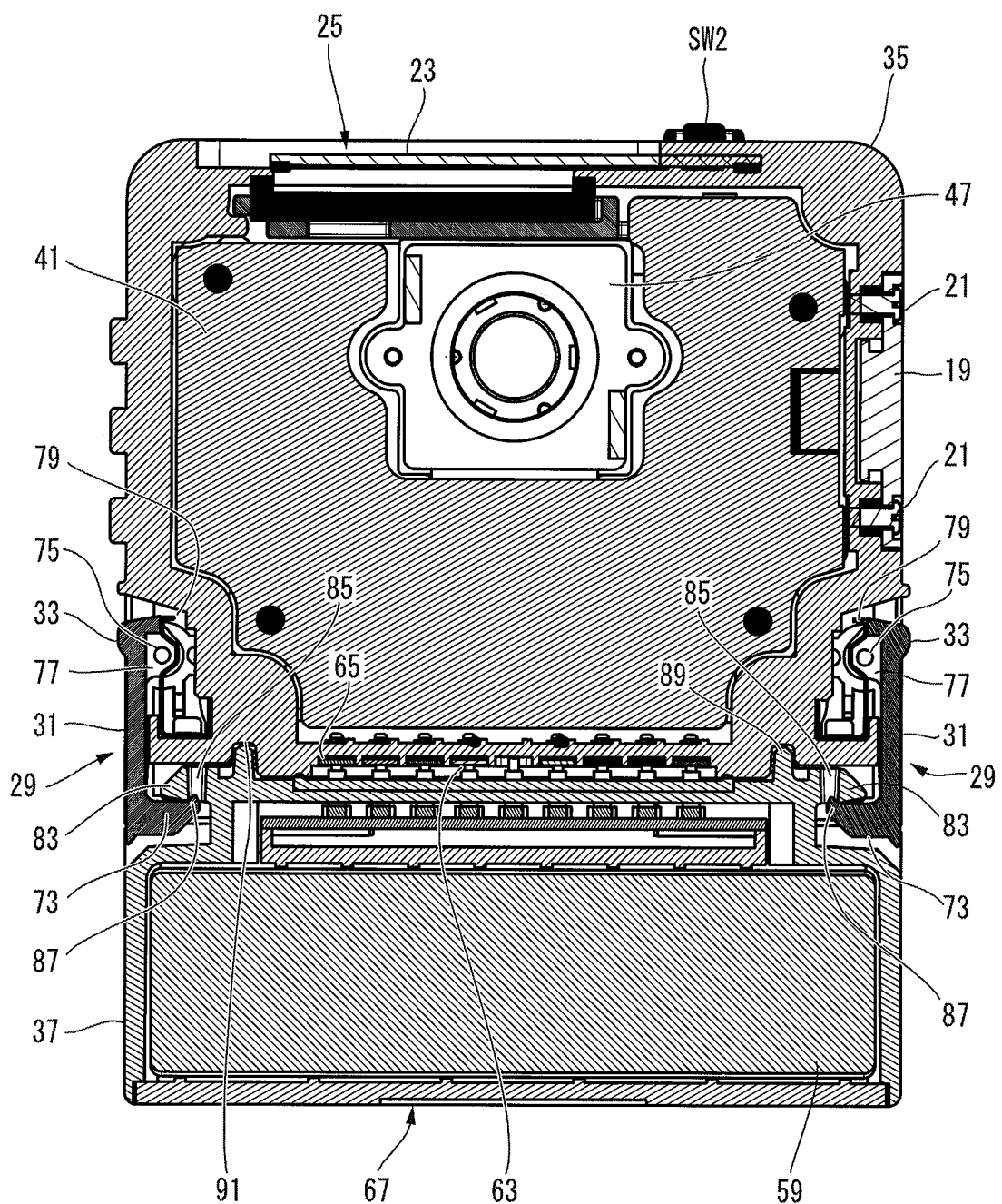
FIG. 6 is a sectional view taken along the line B-B of FIG. 3.

FIG. 6 is a sectional view taken along the line B-B of FIG. 3. A cylindrical battery 59 is housed in the lower housing 37 such that an axis line extends in the horizontal direction. That is, the lower housing 37 becomes a battery case. The battery 59 supplies power to the first printed circuit board 41 or the second printed circuit board 43 housed in the upper housing 35 via an inner contact terminal 61 provided in the lower housing 37. In the inner contact terminal 61, a plurality of pin terminals 63 arranged in the horizontal direction of the lower housing 37 protrudes from the upper surface of the lower housing 37 toward the lower surface of the upper housing 35. In the first embodiment, the inner contact terminal 61 has, for example, nine pin terminals 63. If the upper housing 35 and the lower housing 37 are attached to each other, the inner contact terminals 61 are electrically connected to the same number of counter terminals 65 provided on the lower surface of the upper housing 35.

Meanwhile, a contact terminal 67 for performing charging from a charging stand is provided on the lower surface of the lower housing 37. The contact terminal 67 has a plurality of terminal pieces 69 (see FIG. 11) arranged in the horizontal direction of the lower housing 37 exposed on the lower surface of the lower housing 37. The contact terminal 67 has, for example, five terminal pieces 69. The five terminal pieces 69 exposed on the lower surface of the lower housing 37 are used when the wearable camera 11 is set on a charging stand 71 to be charged in a state where the lower housing 37 is attached to the upper housing 35.

That is, the wearable camera 11 is provided with a larger number of the inner contact terminals 61 than the contact terminals 67 used when charging is performed by being set on the charging stand 71.

In the wearable camera 11, the upper housing 35 and the lower housing 37 have a double locking mechanism including a temporary locking portion 39 and a main locking portion 29 that performs main locking after temporary locking is performed by the temporary locking portion 39. The main locking hook 31 of the main locking portion 29 has a push projection portion 33 formed on an upper outer surface. On an inner surface of the lower portion of the main locking hook 31, a hook claw 73 protrudes inward the housing. As illustrated in FIG. 6, the left and right main locking hooks 31 with the hook claws 73 protruding toward a lower inner surface have an L-shape and an inverted L-shape in front view. The main locking hook 31 is formed with a bearing portion 77 through which a shaft 75 passes on the upper inner surface. In the left and right main locking hooks 31, the shaft 75 is supported by the upper housing 35. That is, the main locking hooks 31 are provided on the left and right side surfaces of the upper housing 35 so as to be swingable. Thereby, in the main locking hook 31, the lower hook claw 73 is swung as each push projection portion 33 on an upper outer surface is pushed thereinto.

A plate spring 79 is pinched between a side surface of the upper housing 35 and the main locking hook 31. The plate spring 79 has a lower end in contact with the side surface of the upper housing 35 and an upper end in contact with the shaft 75 of the locking portion. The plate spring 79 is disposed in an elastically deformed state, thereby, applying a rotational urging force to the main locking hook 31 in a direction in which the hook claw 73 approaches the side surface of the upper housing 35. Thus, the main locking hook 31 in which the push projection portion 33 is pushed by a finger is rotationally disposed in a direction in which the hook claw 73 is swung outward, but if the finger is released, the hook claw 73 again approaches the side surface by an urging force of the plate spring 79.

A block portion 81 that fits on the lower surface of the upper housing 35 protrudes on an upper surface of the lower housing 37. When the main locking hook 31 is rotationally disposed in the direction approaching the side surface, the main locking hook 31 is locked to a claw locking portions 83 formed on the left and right side surfaces of the block portion 81. The claw locking portion 83 is formed in a square plate shape in plan view and protrudes vertically from the side surface of the block portion 81. The claw locking portion 83 becomes a locking guide surface in which a side portion of a protruding tip is formed with a downward slope toward the tip. The locking guide surface guides the hook claw 73 smoothly to a locked state. A square penetration hole 85 penetrating vertically is formed at the center of the claw locking portion 83. The penetration hole 85 receives a beak portion 87 formed at the tip of the hook claw 73 so as not to interfere. Thereby, the main locking hook 31 is reliably locked to the lower housing 37. Then, in the main locking hook 31, as the push projection portions 33 on the upper outer surface are simultaneously pushed, the lower hook claws 73 are swung toward the outside to unlock the lower housing 37 from the claw locking portions 83.

A square peripheral wall 89 is formed uprightly on the upper surface of the block portion 81 so as to surround the inner contact terminal 61 (see FIG. 5). The peripheral wall 89 is fitted into a square peripheral groove 91 formed on the lower surface of the upper housing 35. Thereby, the upper housing 35 and the lower housing 37 in which a vertical separation is controlled by the main locking hook 31 are fixed reliably without rattling in the front-back direction and the horizontal direction.

Figure 7:
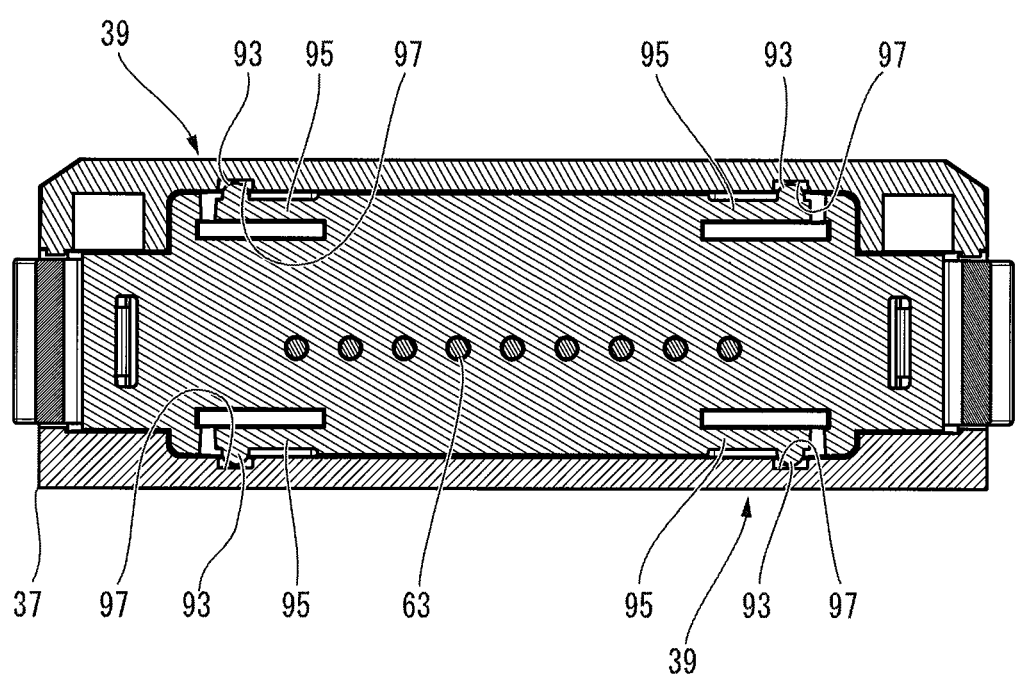
FIG. 7 is a sectional view taken along the line C-C of FIG. 3.

FIG. 7 is a sectional view taken along the line C-C of FIG. 3. The temporary locking portion 39 has a plurality of temporary locking protrusions 93. A pair of left and right temporary locking protrusions 93 are provided on the front and rear surfaces of the peripheral wall 89 upright on the block portion 81. That is, a total of four temporary locking protrusions 93 are formed. Each temporary locking protrusion 93 is formed as a cantilever-like elastic locking piece 95 having a free end at the tip by making a U-shaped cut in the peripheral wall 89. The elastic locking piece 95 has a hemispherical protrusion formed on an outer surface on the tip side.

Figure 8:
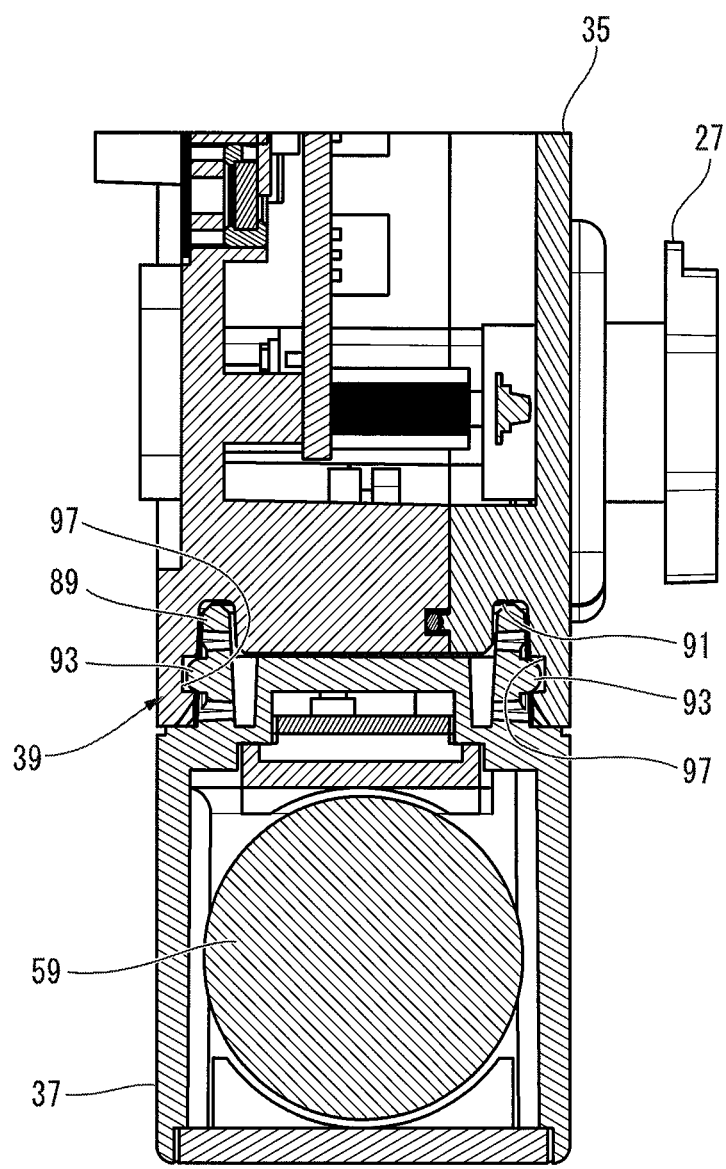
FIG. 8 is a sectional view taken along the line D-D of FIG. 3.

FIG. 8 is a sectional view taken along the line D-D of FIG. 3. The protrusion fits into a protrusion fitting recess portion 97 formed on an inner wall surface on a lower front side and an inner wall surface on a lower rear side of the upper housing 35. The protrusion of the temporary locking protrusion 93 is locked to the protrusion fitting recess portion 97 immediately before the main locking hook 31 is mainly locked to the claw locking portion 83. The lower housing 37 is connected to the upper housing 35 with a degree of freedom without dropping as the temporary locking protrusion 93 is locked to the protrusion fitting recess portion 97. That is, the lower housing 37 can be temporarily fixed to the upper housing 35 before the main locking. Further, since the four temporary locking protrusions 93 are provided, all of the four temporary locking protrusions 93 can be sequentially locked with the protrusion fitting recess portion 97 from any one protrusion, and thereby, temporary locking can be easily performed.

Unlocking of the main locking portion 29 can be performed by releasing the hook claw 73 from the claw locking portion 83 by pushing the push projection portion 33 of the main locking hook 31 against the urging force of the plate spring 79. Further, in order to release the temporary locking of the temporary locking portion 39, the lower housing 37 is pulled away from the upper housing 35 to such an extent that the four elastic locking pieces 95 are detached from the protrusion fitting recess portion 97, and thereby, the protrusion of the elastic locking piece 95 can be elastically deformed in a direction to be detached from the protrusion fitting recess portion 97. Further, the lower housing 37 can simultaneously lock the main locking hook 31 and the temporary locking protrusion 93 to be coupled to the upper housing 35 by pushing the block portion 81 of the lower housing 37 into the peripheral groove 91 opened in a lower surface of the upper housing 35.

Next, a method of charging the wearable camera 11 will be described.

Figure 9:
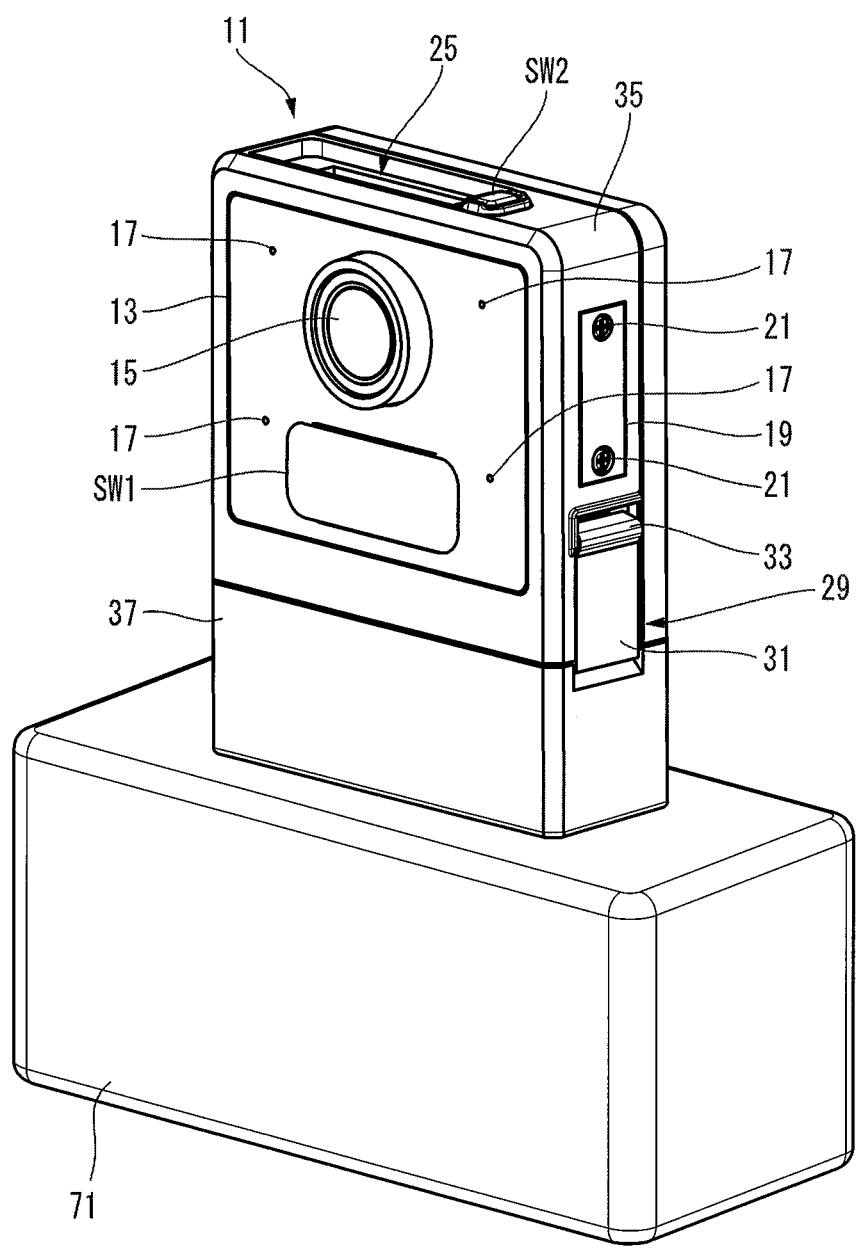
FIG. 9 is a perspective view illustrating a situation when the wearable camera is charged.

FIG. 9 is a perspective view illustrating a situation when the wearable camera 11 is charged. In the wearable camera 11, if a necessary power is not supplied to the upper housing 35 as a result of the battery 59 being discharged, the battery 59 can be charged while the lower housing 37 is attached to the upper housing 35. That is, the wearable camera 11 is held (set) in a standing state with respect to the charging stand 71 by inserting the lower housing 37 attached to the upper housing 35 into the charging stand 71. In the set state, the wearable camera 11 can be charged by connecting the contact terminal 67 provided on the lower surface of the lower housing 37 to a charging contact point of the charging stand 71.

Figure 10:
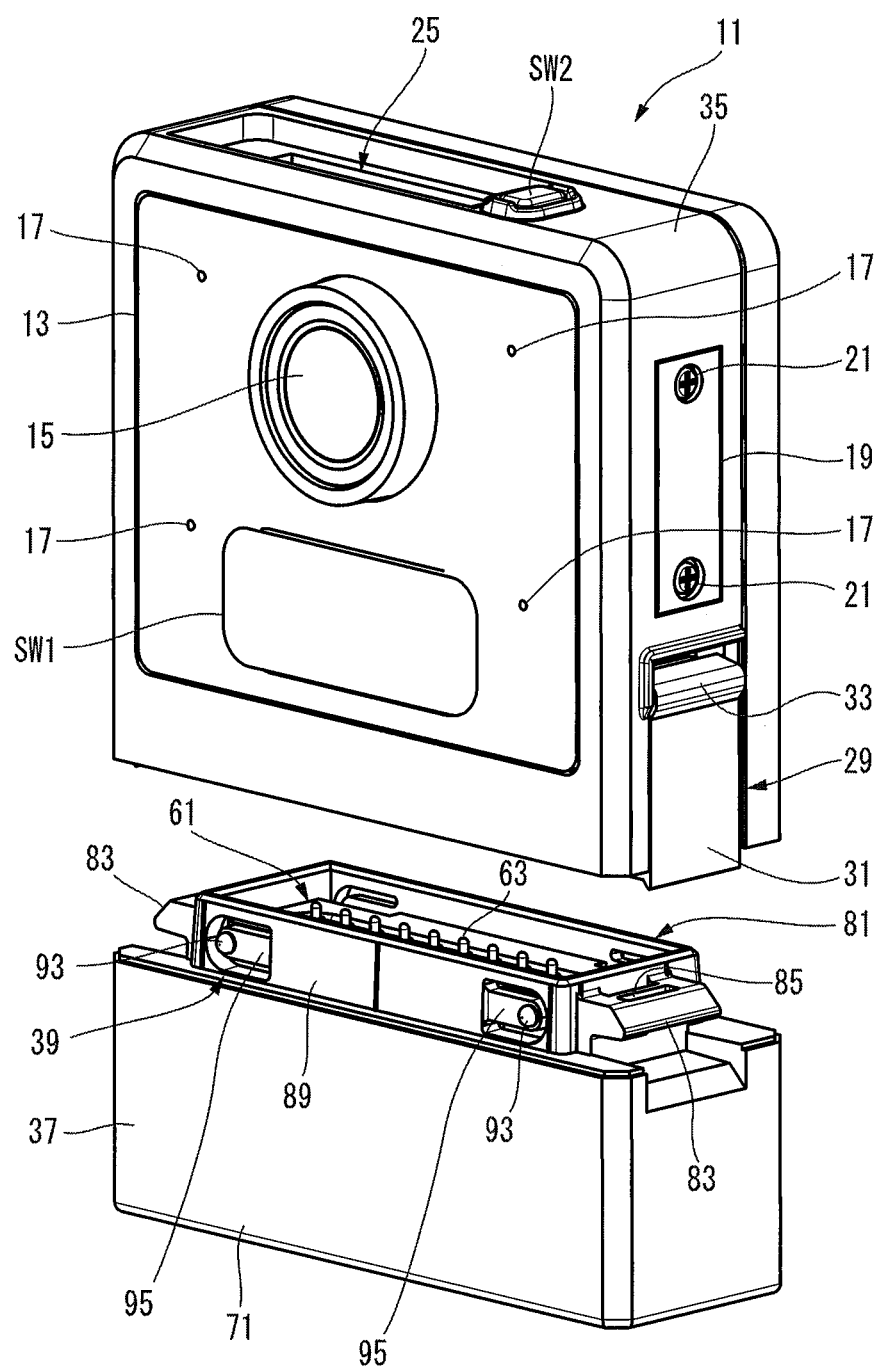
FIG. 10 is an exploded perspective view of the wearable camera with upper and lower housings separated from each other.

FIG. 10 is an exploded perspective view of the wearable camera 11 in which the upper housing 35 and the lower housing 37 are separated. Meanwhile, in the wearable camera 11, the battery 59 can be charged by connecting only the lower housing 37 removed from the upper housing 35 to the charging stand 71.

Figure 11:
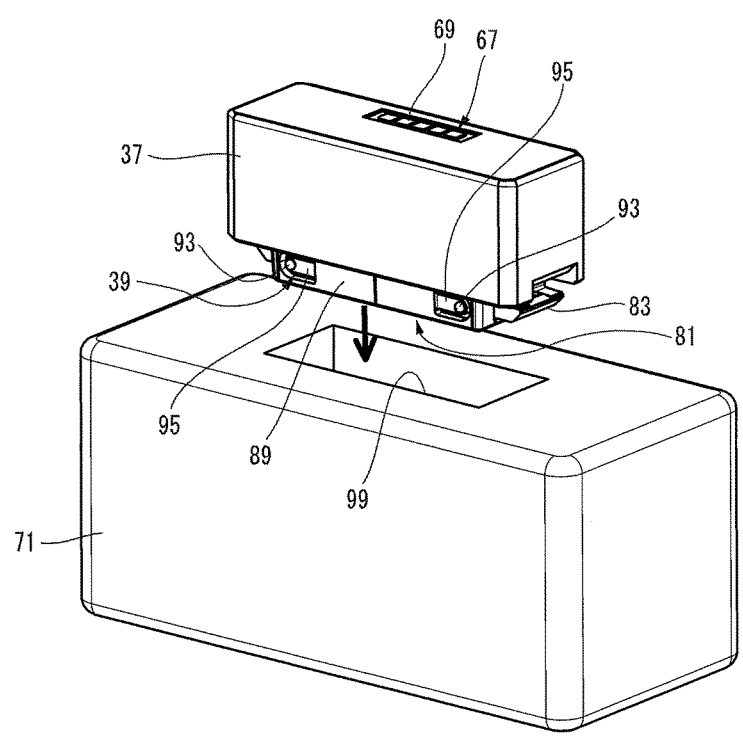
FIG. 11 is a perspective view just before the lower housing is set on a charging stand.

FIG. 11 is a perspective view immediately before the lower housing 37 is set on the charging stand 71. When only the lower housing 37 is charged alone, the locking due to the locking portion is released from the upper housing 35, and thereafter, the lower housing 37 is turned upside down such that the inner contact terminal 61 faces downward. When charging only the lower housing 37 alone, the charging stand 71 is preferably provided with a first charging control circuit (not illustrated) used when charging only the lower housing 37 alone. That is, the charging stand 71 includes a second charging control circuit (not illustrated) used when charging is performed by insertion in a state where the upper housing 35 and the lower housing 37 are docked, and the first charging control circuit described above, and can be switched to use one of those.

Figure 12:
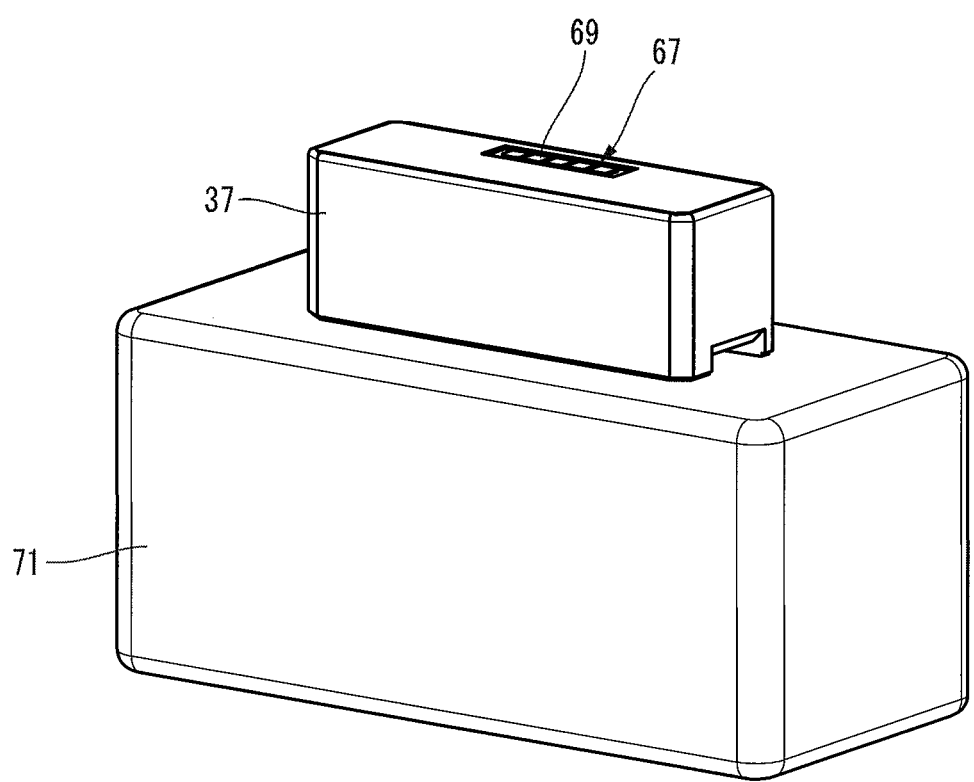
FIG. 12 is a perspective view after the lower housing is set on the charging stand.

FIG. 12 is a perspective view after the lower housing 37 is set on the charging stand 71. Next, the block portion 81 of the lower housing 37 is inserted into a charging hole 99 of the charging stand 71. Thereby, the battery 59 housed in the lower housing 37 is connected to the charging circuit of the charging stand 71 via the inner contact terminal 61 and enters a state in which charging is performed.

Next, communication using the wearable camera 11 will be described.

Figure 13:
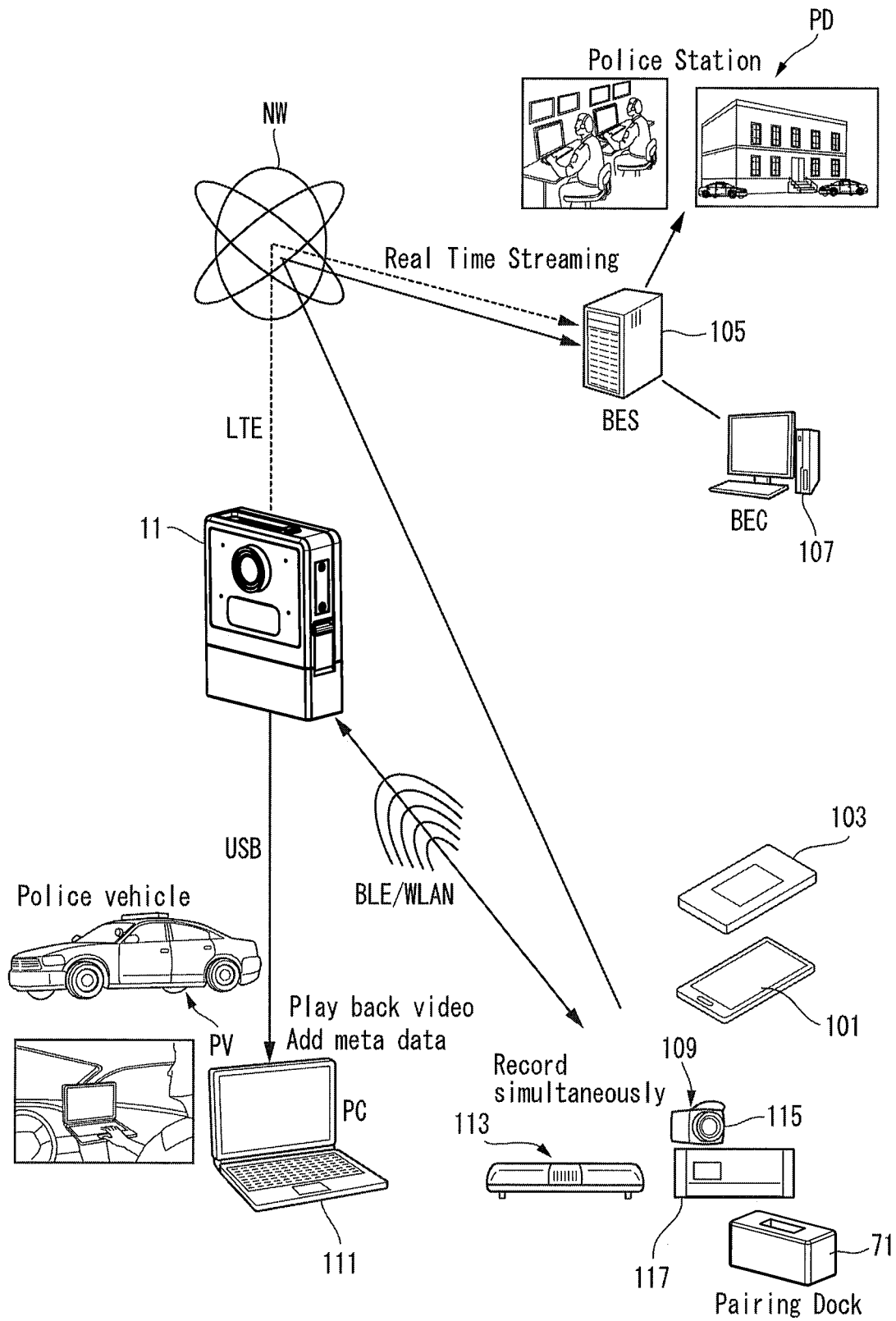
FIG. 13 is a schematic explanatory diagram illustrating a configuration example of a communication system using the wearable camera.

FIG. 13 is a schematic explanatory diagram illustrating a configuration example of a communication system using the wearable camera 11. The wearable camera 11 can communicate with various apparatuses used by a police officer at the site, various apparatuses used or mounted inside a police vehicle PV (for example, a patrol car), and various apparatuses disposed in a police department (PD).

Various apparatuses used by the police officer at the site include, for example, at least a smartphone 101 (which may be a tablet terminal) that can be possessed by the police officer and the wireless LAN access point 103 that can be possessed by the police officer and are not limited thereto. The smartphone 101 and the wireless LAN access point 103 are possessed in a pocket or the like of a uniform worn by, for example, the police officer.

Various apparatuses disposed in the police station PD include, for example, at least a back-end server 105 (BES: Back-End Server) and a back-end client 107 (BEC: Back-End Client) and are not limited thereto.

Various apparatuses used or mounted inside the police vehicle PV include, for example, an in-vehicle camera system 109 (ICV: In-Car Video system), an in-vehicle PC 111, and a rotation warning light 113 and are not limited thereto.

The in-vehicle camera system 109 includes one or a plurality of in-vehicle cameras 115, the in-vehicle PC 111, and an in-vehicle recorder 117, and images and records an accident encountered during running on the police vehicle PV or a situation during patrol as a video. The in-vehicle camera 115 includes one or more of, for example, cameras installed to image front of the police vehicle PV, and each camera installed to image of the left side, the right side, and the rear of the police vehicle PV.

The in-vehicle PC 111 as an example of an edition device controls operations of the in-vehicle camera 115 and the in-vehicle recorder 117 according to an operation of the police officer. The in-vehicle recorder 117 records video data respectively imaged by the plurality of in-vehicle cameras 115 in time series. Further, when the in-vehicle PC 111 is connected to the wearable camera 11 via the Universal Serial Bus (USB), the wearable camera 11 can be charged, and video data imaged by the wearable camera 11 is acquired via the USB and is reproduced in a default application installed in the in-vehicle PC 111 or video attribute information is assigned in the application according to the operation of the police officer.

The wearable camera 11 transmits the data directly to the back-end server 105 via the wireless LAN access point 103, or provides streaming via the smartphone 101 or the wireless LAN access point 103 and a network NW (for example, a wide-area communication network such as a mobile network or the Internet network) to the back-end server 105.

The wireless LAN access point 103 relays data from the wearable camera 11 to the back-end server 105 in the police station PD. A wireless communication (for example, BLE (Bluetooth (registered trademark) Low Energy)) or wireless LAN (for example, WiFi (registered trademark)) is used between the wearable camera 11 and the smartphone 101 or the wireless LAN access point 103. The wireless LAN may be referred to as WLAN.

In the wearable camera 11, data acquired by the upper housing 35 is sent to the police vehicle PV via the wireless LAN which is one of the two wireless communication units.

Further, in the wearable camera 11, the data acquired by the upper housing 35 is sent to a server device of the police station via LTE which is the other of the two wireless communication units.

FIG. 14 is a table illustrating an example of communication means for each transmission data. Data transmitted from the wearable camera 11 is roughly divided into live data, recorded data, and metadata. The live data is real-time data used for live streaming. The recorded data is recorded past data. The metadata is attribute information assigned to video data.

The attribute information is selected by an operation of the attribute information assignment switch SW4 and is provided by an operation of the attribute information assignment switch SW4. When the wearable camera 11 is used, attribute information is assigned and set in correspondence with a state (contact point location) of the attribute information assignment switch SW4. For example, when a police officer images a state of an incident site, drunk driving (Driving Under the Influenza), drug abuse (Drug Abuse Violations), and theft (Stolen Property) are assigned.

Wearable camera 11 can send the live data, the recorded data, and the metadata by using different communication means depending on a data destination. The wearable camera 11 uses LTE as communication means when sending data to a headquarters such as a back-end server in the police station PD via Cloud. In the wearable camera 11 on which the LTE printed circuit board 49 is not mounted, data is sent via a police car. In this case, a wireless LAN is used for the police car from the wearable camera 11. LTE is used from the police car to the headquarters.

Meanwhile, when the LTE printed circuit board 49 is provided, the wearable camera 11 can directly send data to the headquarters using LTE without going through a police car.

Further, the wearable camera 11 uses a wireless LAN or BLE as communication means when the data destination is a mobile phone. Further, the wearable camera 11 uses the wireless LAN as the communication means when the data destination is the in-vehicle recorder 117 or the in-vehicle PC 111.

Next, an internal configuration of the wearable camera 11 will be described.

Figure 15:
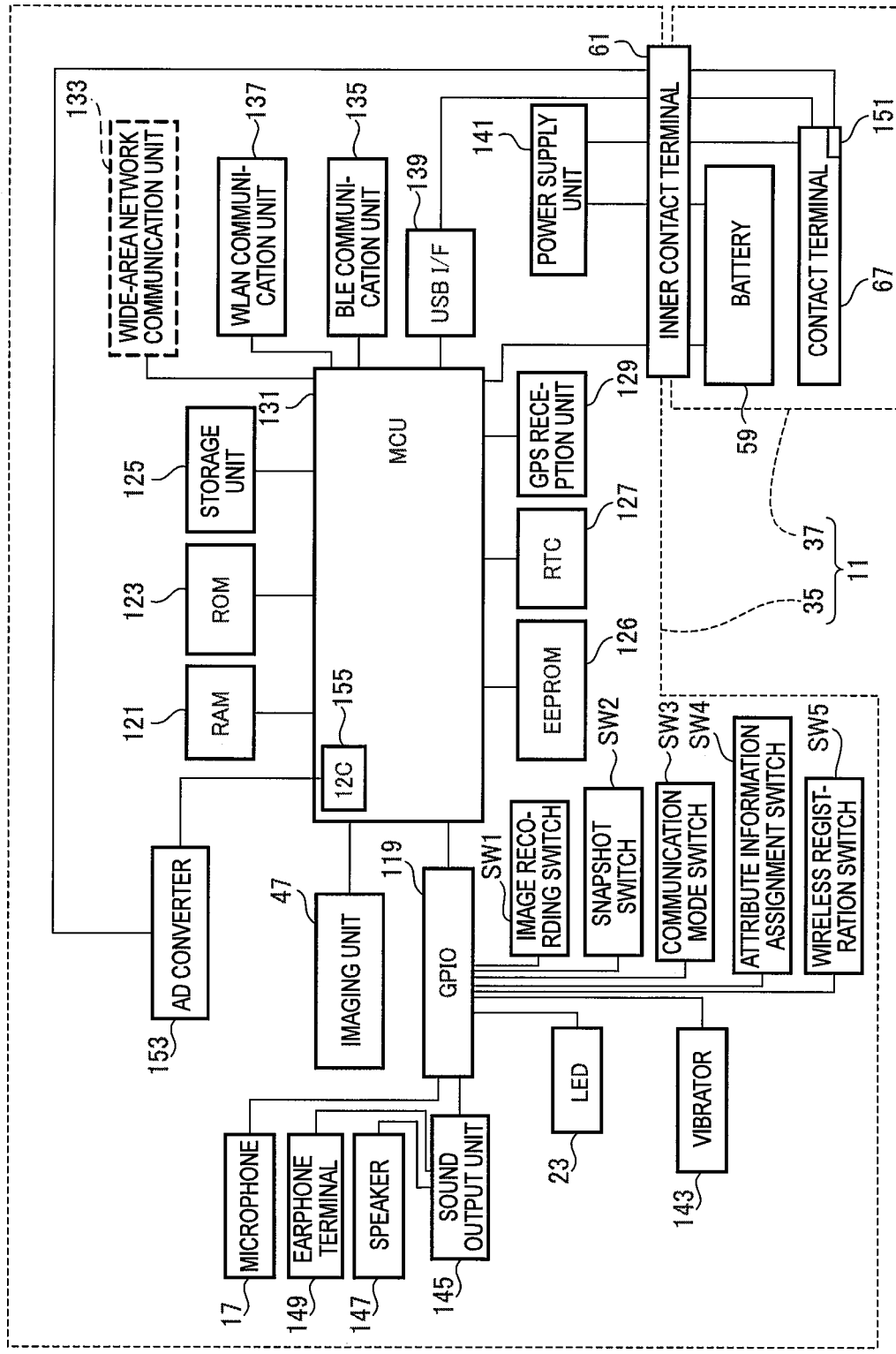
FIG. 15 is a block diagram illustrating an example of the internal configuration of the wearable camera.

FIG. 15 is a block diagram illustrating an example of the internal configuration of the wearable camera 11. The wearable camera 11 includes an imaging unit 47, general purpose input/output (GPIO) 119, a random access memory (RAM) 121, a read only memory (ROM) 123, and a storage unit 125. The wearable camera 11 includes an electrically erasable programmable ROM (EEPROM) 126, an RTC 127, and a global positioning system (GPS) reception unit 129. The wearable camera 11 includes a micro control unit (MCU) 131 which is a control unit, a wide-area network communication unit 133, a BLE communication unit 135, a WLAN communication unit 137, a USB interface 139, a contact terminal 67, a power supply unit 141, and a battery 59.

The wearable camera 11 includes the image recording switch SW1, the snapshot switch SW2, the communication mode switch SW3, the attribute information assignment switch SW4, and the wireless registration switch SW5.

The wearable camera 11 includes the LCD 23 for a display panel, a vibrator 143, a sound output unit 145, a microphone 17, a speaker 147, and an earphone terminal 149. The display panel 25, the vibrator 143, and the sound output unit 145 function as an example of a notification unit that notifies the user.

The imaging unit 47 includes an imaging lens 15 (see FIG. 3) and a solid-state imaging element such as a charge coupled device (CCD) type image sensor or a complementary metal oxide semiconductor (CMOS) type image sensor. The imaging unit 47 outputs video data based on a subject image obtained by capturing an image to the MCU 131.

A detection terminal 151 of the contact terminal 67 is a terminal that causes a voltage change when the wearable camera 11 is placed (set) on the charging stand 71 or a gang charger, or when the wearable camera is removed from the charging stand 71 or the gang charger. The detection terminal 151 of the contact terminal 67 is connected to an AD converter 153. A signal indicating the voltage change of the detection terminal 151 is converted into a digital signal by the AD converter 153, and the digital signal is input to the MCU 131 via an inter-integrated circuit (I2C) 155.

The GPIO 119 is a parallel interface. The GPIO 119 is connected to the image recording switch SW1, the snapshot switch SW2, the communication mode switch SW3, the attribute information assignment switch SW4, the wireless registration switch SW5, the LCD 23, the vibrator 143, the sound output unit 145, the microphone 17, the speaker 147, and the earphone terminal 149. The GPIO 119 inputs and outputs signals between the various electronic components and the MCU 131.

The microphone 17 collects sound around the wearable camera 11 and outputs sound data of the collected sound to the MCU 131 via the GPIO 119. The microphone 17 may be a built-in microphone housed in the housing of the wearable camera 11 or a wireless microphone wirelessly connected to the wearable camera 11. In a case of the wireless microphone, the police officer attaches the microphone to any location, and a sound collecting performance can be improved.

The sound output unit 145 outputs a sound signal relating to an operation of the wearable camera 11 under an instruction of the MCU 131. The sound output unit 145 reads sound data having a predetermined message sound previously stored in the ROM 123 or the like, and outputs the sound signal based on the sound data from the speaker 147. The earphone terminal 149 outputs the sound signal output from the sound output unit 145 to an earphone connected to the earphone terminal 149. The speaker 147 inputs the sound signal output from the sound output unit 145 and outputs sound.

Further, the AD converter 153 is connected to the MCU 131 via a communication interface such as the inter-integrated circuit (I2C) 155. A similar effect can be obtained even by connecting the detection terminal 151 of the contact terminal 67 to the GPIO 119 without using the AD converter 153.

The RAM 121 is, for example, a work memory used for an operation of the MCU 131. The ROM 123 previously stores, for example, a program for controlling the operation (processing) of the MCU 131 and data.

The storage unit 125 as an example of a first memory is configured by a storage medium such as a memory card, and starts data recording (that is, image recording) of a video imaged by the imaging unit 47, for example, based on an instruction to start image recording based on an operation of a police officer. The storage unit 125 always pre-buffers and holds video data imaged by the imaging unit 47 for a predetermined time (for example, 30 seconds), and always continues to store video data prior to the current time by the predetermined time (for example, 30 seconds). Upon receiving an instruction to start recording, the storage unit 125 starts recording video data and continues to record the video data until receiving an instruction to stop the recording. Further, the storage unit 125 has a setting data file in which resolution up information and the like are set. For example, when the storage unit 125 is configured by a memory card, the storage unit is detachably mounted to the housing of the wearable camera 11.

The EEPROM 16 stores, for example, identification information (for example, a serial number as a camera ID) for identifying the wearable camera 11 and various types of setting information. The RTC 127 counts current time information and outputs the information to the MCU 131.

The GPS reception unit 129 receives satellite signals which are transmitted from a plurality of GPS transmitters (for example, four navigation satellites) and include their own signal transmission times and location coordinates, and outputs the satellite signals to the MCU 131. The MCU 131 uses the plurality of satellite signals to calculate current location coordinates of the wearable camera 11 and reception times of the satellite signals. This calculation may be performed by the GPS reception unit 129 instead of the MCU 131. This reception time information may also be used for correcting a system time (that is, an output of the RTC 127) of the wearable camera 11. The system time is used for recording and the like of imaging times of the captured images (including a still image and a moving image).

The MCU 131 has a function as a control unit of the wearable camera 11 and performs, for example, control processing for overall control of operations of each unit of the wearable camera 11, data input/output processing between each unit of the wearable camera 11, data arithmetic (calculation) processing, and data storage processing. The MCU 131 operates according to various programs and data stored in the ROM 123. During operation, the MCU 131 uses the RAM 121 to obtain current time information from the RTC 127 and also obtains current location information from the GPS reception unit 129.

The wide-area network communication unit 133 as an example of a communication unit uses a communication mode of the LTE which is one of cellular phone communication standards, and performs a wireless communication with a network NW (for example, a wide-area communication network such as a mobile line network or the Internet network).

The BLE communication unit 135 as an example of a communication unit performs a wireless communication with the smartphone 101 and the like by using a communication mode of BLE that is a communication standard of a short-range wireless communication. The BLE is a name of Bluetooth (registered trademark) version 4.0. In the BLE, communication is possible with a low power consumption, and a communication speed is as low as approximately 100 kbps.

The WLAN communication unit 137 as an example of a communication unit is connected to the smartphone 101 as a wireless LAN access point using a tethering function, the wireless LAN access point 103 or the wireless LAN access point 103 of a wireless LAN which is usable in the police station PD, and the like via the wireless LAN (that is, WLAN), and performs a wireless communication with a connection destination. Compared with the BLE, the wireless LAN can communicate at a high speed of several tens to several hundreds Mbps, but power consumption increases because the wireless LAN is always connected to the wireless LAN access point 103.

The wearable camera 11 may have a configuration (not illustrated) of a communication unit for performing a short-range wireless communication such as a near field communication (NFC) or a wireless communication using a mobile network (for example, LTE) in addition to the BLE communication and the WLAN communication.

The USB interface 139 is a serial bus, and enables, for example, a connection of the in-vehicle PC 111 and the back-end client 107 in the police station PD.

The contact terminal 67 is a terminal for electrical connection to the charging stand 71, is connected to the MCU 131 via the USB interface 139, and is connected to the power supply unit 141. The power supply unit 141 charges the battery 59 according to detection of connection with the charging stand 71 in the contact terminal 67. The contact terminal 67 can transmit video data read from the storage unit 125 by the MCU 131 to an external apparatus (for example, the in-vehicle PC 111) connected via the charging stand 71 according to the connection with the charging stand 71.

The contact terminal 67 is provided with, for example, a "charging terminal V+" (not illustrated), the "detection terminal 151", "data terminals D- and D+" (not illustrated), and a "ground terminal" (not illustrated). The detection terminal 151 is a terminal for detecting a voltage and a voltage change. The data terminals D and D+ are terminals for transferring video data imaged by the wearable camera 11 to the in-vehicle PC 111 via, for example, a USB connector terminal. The detection terminal 151 of the contact terminal 67 is connected to a communication interface such as I2C 155 via the AD converter 153, and a detection voltage value of the contact terminal 67 is input to the MCU 131.

By connecting the contact terminal 67 and a connector of the charging stand 71, a data communication is possible between the wearable camera 11 and an external device (for example, the in-vehicle PC 111).

The power supply unit 141 supplies the battery 59 with a charging current supplied from an external power supply (for example, a cigar charger in the police vehicle PV or an accessory in the police vehicle PV) connected to the charging stand 71 via, for example, the contact terminal 67, thereby, charging the battery 59.

The battery 59 is configured by, for example, a rechargeable secondary battery, and supplies power to each unit of the wearable camera 11.

The image recording switch SW1 is a push button switch for inputting an operation instruction for starting/stopping recording (moving image capturing) by, for example, a push operation of a police officer. Further, for example, the MCU 131 may start recording (moving image capturing) when the image recording switch SW1 is pushed for a short time and may end the recording when the image recording switch SW1 is pushed for a long time. Further, for example, the MCU 131 may start the recording (moving image capturing) when the image recording switch SW1 is pushed an odd number of times and may end the recording when the image recording switch SW1 is pushed an even number of times.

The snapshot switch SW2 is, for example, a push button switch for inputting an operation instruction for capturing a still image according to a push operation of a police officer. For example, every time the snapshot switch SW2 is pushed, the still image is captured by the MCU 131 at the time of push.

The communication mode switch SW3 is a slide switch that inputs an operation instruction for setting a communication mode between, for example, the wearable camera 11 and an external device. The communication mode includes, for example, an access point mode, a station mode, and an OFF mode.

The access point mode is a mode in which the wearable camera 11 operates as a wireless LAN access point and is wirelessly connected to the smartphone 101 possessed by a police officer, and a communication is performed between the wearable camera 11 and the smartphone 101. In the access point mode, the smartphone 101 is connected to the wearable camera 11, thereby, being able to display a current live image captured by the wearable camera 11, to play the recorded image, to display the captured still image, and the like.

The station mode is a mode for communicating with an external device as an access point when connecting to the external device using a wireless LAN. For example, the smartphone 101 may be set as the external device using a tethering function of the smartphone 101. In the station mode, the wearable camera 11 can perform various types of setting, transfer (upload) of recorded images held by the wearable camera 11, and the like to the back-end client 107 and back-end server 105 in the in-vehicle camera system 109 and the police station PD.

The OFF mode is a mode in which a communication operation of the wireless LAN is turned off and the wireless LAN is not used.

The attribute information assignment switch SW4 is a push button switch operated to assign attribute information to video data. The attribute information indicates contents (for example, a type of incident, murder, robbery, disaster, and the like) of the video imaged by the wearable camera 11.

The wireless registration switch SW5 as an example of a first instruction unit is a push button switch that is operated when a partner external device (for example, the smartphone 101 or the wireless LAN access point 103) performing a wireless communication (for example, a wireless communication using the BLE or the wireless LAN) with the wearable camera 11 is registered and set as a communication partner (hereinafter, may also be referred to as "communication setting processing"). Hereinafter, in the wireless communication using, for example, the BLE, processing of registering and setting an apparatus as a communication partner may be referred to as "pairing".

The LCD 23 displays, for example, a power-on state (on/off state) of the wearable camera 11 and a state of the battery 59.

The LCD 23 displays, for example, a state (image recording state) of an imaging operation of the wearable camera 11.

The LCD 23 displays, for example, a state of a communication mode of the wearable camera 11. Further, if the wearable camera 11 receives notification data from the back-end server 105, the LCD 23 performs a blinking operation according to an instruction from the MCU 131. At this time, the MCU 131 changes a blinking pattern of the LCD 23 according to information which is included in the notification data and relates to a sound source.

The MCU 131 detects an input of each of the image recording switch SW1, the snapshot switch SW2, the communication mode switch SW3, the attribute information assignment switch SW4, and the wireless registration switch SW5, and performs processing for the switch input that is operated.

When an operation input of the image recording switch SW1 is detected, the MCU 131 controls start or stop of an imaging operation of the imaging unit 47, and stores the image obtained from the imaging unit 47 in the storage unit 125 as a moving image.

When an operation input of the snapshot switch SW2 is detected, the MCU 131 stores an image obtained by the imaging unit 47 when the snapshot switch SW2 is operated in the storage unit 125 as a still image.

The MCU 131 detects a state of the communication mode switch SW3 and operates the communication unit in the communication mode according to setting of the communication mode switch SW3.

When the attribute information assignment switch SW4 is pushed, the MCU 131 assigns attribute information corresponding to video data imaged by the imaging unit 47 in association with the video.

When the wireless registration switch SW5 is pushed, the MCU 131 performs default processing to be performed in a communication setting processing (for example, pairing) for a peripheral device (for example, the in-vehicle PC 111) that can be a communication partner of the wearable camera 11. Here, if the pairing is exemplified, the default processing is a generation of registration request information as a communication partner of the wireless communication and an output to the BLE communication unit 135, a generation of connection information for specifying the communication partner which is a connection destination and the output to the BLE communication unit 135, and a storage of the connection information transmitted from the communication partner in the storage unit 125. However, it goes without saying that the default processing relating to the wireless LAN communication setting is the same as the default processing when the above-described pairing is exemplified.

Next, an operation of the wearable camera 11 according to the first embodiment will be described.

The wearable camera 11 according to the first embodiment includes an imaging unit 47 that images a subject around (for example, the front) a user, and a control unit that controls the imaging processing of the imaging unit 47 and the charging processing of the battery 59. The wearable camera 11 can be mounted to the user and includes the upper housing 35 that houses at least the imaging unit 47 and the control unit, and the lower housing 37 that houses the battery 59 for supplying power to the upper housing 35 and is detachably attached to the upper housing 35, exposes the contact terminal 67 used for charging, and can be connected to the charging stand 71 via the contact terminal 67 in a state of being attached to the upper housing 35 to charge the battery 59.

In the wearable camera 11 according to the first embodiment, at least the imaging unit 47 and the MCU 131 are housed in the upper housing 35 that can be mounted to the user. The imaging unit 47 images a subject around the user (for example, the front). The MCU 131 controls the imaging operation of the imaging unit 47 and controls a charging operation of the battery 59. The lower housing 37 is detachably attached to the upper housing 35. The battery 59 for supplying power to the upper housing 35 is housed in the lower housing 37. In the wearable camera 11, the imaging unit 47 performs an imaging operation using the battery 59 as a power source in a state in a state where the lower housing 37 is integrally attached to the upper housing 35.

The wearable camera 11 can charge the battery 59 while the lower housing 37 is attached to the upper housing 35 (see FIG. 9). The wearable camera 11 is held (set) in an upright state with respect to the charging stand 71 by inserting the lower housing 37 attached to the upper housing 35 into the charging stand 71. In the set state, the wearable camera 11 can be charged by connecting the contact terminal 67 provided on, for example, a lower surface of the lower housing 37 to a charging contact point of the charging stand 71.

At this time, the wearable camera 11 operates a charging control circuit housed in the upper housing 35 by using the MCU 131 housed in the upper housing 35 and charges the battery 59 while monitoring the charging state. If the charging of the battery 59 is completed, the MCU 131 notifies, for example, the display unit and the like provided in the upper housing 35 of the charging completion. Thereby, the wearable camera 11 can be used with the lower housing 37 and the upper housing 35 integrated with each other being detached from the charging stand 71.

In the wearable camera 11, the lower housing 37 can be detached from the upper housing 35. The wearable camera 11 can include a spare lower housing 37 that houses the battery 59. The wearable camera 11 can charge the battery 59 housed in the spare lower housing 37 while using the upper housing 35 and the lower housing 37 integrated with each other. Thereby, when the battery 59 of the lower housing 37 is discharged, the wearable camera 11 can supply power to the upper housing 35 only by replacing the lower housing 37 with the spare lower housing 37. That is, it is not necessary to wait for use of the wearable camera 11 until the charging of the battery 59 is completed. Accordingly, the wearable camera 11 can be used for a long time in a continuous state only by exchanging the lower housing 37 without charging time being idle time. As a result, it is possible to avoid that the wearable camera 11 cannot be used by a user due to charging restrictions.

Thus, according to the wearable camera 11 according to the first embodiment, it is possible to avoid non-usage of the user based on restrictions on charging of the battery 59 built in the housing, and to improve usability of the user.

Further, in the wearable camera 11, the lower housing 37 includes the inner contact terminal 61 used for power supply from the battery 59 to the upper housing 35. The battery 59 is charged by the charging stand 71 via the inner contact terminal 61 in a state of being removed from the upper housing 35.

In the wearable camera 11, when the lower housing 37 removed from the upper housing 35 is set on the charging stand 71 as a single unit, the contact terminal 67 is not used for the lower housing 37. In the lower housing 37, for example, the inner contact terminal 61 is provided on an upper surface opposite to the contact terminal 67 disposed on the lower surface. In a state where the lower housing 37 is integrally attached to the upper housing 35, power is supplied to the upper housing 35 via the inner contact terminal 61. Further, when the lower housing 37 attached integrally to the upper housing 35 is set on the charging stand 71 and charging is performed, the MCU 131 of the upper housing 35 monitors the charging status of the battery 59 in the lower housing 37 via the inner contact terminal 61. By using the inner contact terminal 61, the lower housing 37 can be charged by the charging stand 71 as a single unit. That is, the lower housing 37 can be charged by the charging stand 71, either integrally with the upper housing 35 or as a single unit.

Further, in the wearable camera 11, the number of terminals to be connected to the charging stand 71 is greater in the inner contact terminal 61 than in the contact terminal 67.

In the wearable camera 11, in a state where the lower housing 37 is integrally attached to the upper housing 35, power is supplied to the upper housing 35 via the inner contact terminal 61. At this time, the MCU 131 housed in the upper housing 35 monitors a charging status of the battery 59 in the lower housing 37 via the inner contact terminal 61. The number of terminals of the inner contact terminal 61 connected to a circuit for monitoring the battery 59 is greater than the number of terminals of the contact terminal 67. That is, when the contact terminal 67 is configured by arranging, for example, five terminals, the inner contact terminal 61 is configured by arranging nine terminals. In this case, in the inner contact terminal 61, four terminals connected to a circuit for monitoring the battery 59 are arranged to be more than the contact terminal 67.

The lower housing 37 separated from the upper housing 35 cannot monitor and control the charging status of the battery 59 by the MCU 131. Therefore, in the wearable camera 11, a monitoring/control circuit unit that performs a monitoring/control operation which is the same as the MCU 131 is also provided in the charging stand 71. The wearable camera 11 can be connected to the monitoring/control circuit unit provided in the charging stand 71 via the inner contact terminal 61 of the lower housing 37. That is, for this connection, four terminals for monitoring and controlling the batteries 59 arranged more than the contact terminal 67 are used. Thereby, in the wearable camera 11, even when the lower housing 37 is a single unit, a monitoring/control circuit unit of the charging stand 71 can perform charging while performing a monitoring/control operation equivalent to the MCU 131, in the same manner as a case where the lower housing 37 attached to the upper housing 35 is charged by the charging stand 71 via the contact terminal 67.

Further, in the wearable camera 11, the upper housing 35 and the lower housing 37 are doubly locked by the temporary locking portion 39 and the main locking portion 29 that performs main locking after temporary locking is performed by the temporary locking portion 39.

In the wearable camera 11, the upper housing 35 and the lower housing 37 are attached to and detached from a locking portion. The locking portion is configured by the temporary locking portion 39, the main locking portion 29, and the double locking mechanism. The temporary locking portion 39 simply regulates separation of the upper housing 35 and the lower housing 37 before the main locking. In a temporary locking state by the temporary locking portion 39, a relative movement between the upper housing 35 and the lower housing 37 is regulated by an urging member provided in the locking portion by a certain amount of force. Accordingly, in the temporary locking state, generation or the like of an abnormal noise that the upper housing 35 and the lower housing 37 hit each other is suppressed. Thereby, product quality can be increased. Further, since a relative locking location before the main locking is substantially determined by the temporary locking portion 39, the upper housing 35 and the lower housing 37 are easily moved to the main locking as compared with a case where the main locking operation is performed at a certain relative location. As a result, the locking operation can be performed stably.

Further, in the wearable camera 11 includes a pair of main locking hooks 31 which are provided on the left and right side surfaces of the upper housing 35 respectively so as to be swingable, and in which, as push projection portions 33 on an upper outer surface are simultaneously pushed, hook claws 73 at a lower end are swung toward an outside to unlock the lower housing 37 from the claw locking portions 83.

In the wearable camera 11, the main locking hook 31 is provided on the shaft 75 supported by the upper housing 35 so as to be swingable. In the main locking hook 31, as the pressing push projection portions 33 exposed on the left and right side surfaces of the upper housing 35 are simultaneously pushed, the hook claws 73 at the lower end are swung toward the outside to unlock the lower housing 37 from the claw locking portions 83. In a pair of left and right main locking hooks 31, even if only one of the right and left push projection portions 33 is pushed, the hook claw 73 of the other main locking hook 31 remains in the locking state, and thereby, the main locking state is not released. Thus, if the pair of main locking hooks 31 are not operated simultaneously, the wearable camera 11 cannot release the main locking and prevents the main locking from being released due to an erroneous operation such as inadvertent push of one of the main locking hooks 31.

Further, the main locking hook 31 is supported to the upper housing 35 via the shaft 75 so as to be swingable between the push projection portion 33 and the hook claw 73. Accordingly, a push operation force to the push projection portion 33 can be reliably converted into an unlocking force of the hook claw 73 with a simple structure, an abnormal operation due to catching and the like are less likely to occur, an unlocking operation is smooth, and reliability of a locking mechanism can be increased.

Further, in the wearable camera 11, the upper housing 35 houses two wireless communication units.

In the wearable camera 11, the upper housing 35 is housed so as to include the two wireless communication units. One of the two wireless communication units can be a wireless LAN. For example, the BLE or the wireless LAN can be used as a communication technique for performing the wireless LAN. The other one can be a mobile network. For example, the LTE which is a cellular phone communication standard can be used as a communication technique using the mobile network. In the wireless LAN, a range in which a radio wave reaches is shorter than a range of the LTE, but there is no limit on a communication capacity, which is advantageous for viewing data with an increased communication capacity. Meanwhile, in the LTE, the communication capacity is limited, but the radio wave is stable even when used outdoors because of a communication technology created by assuming use of a mobile phone outdoors. Since there are many base stations that transmit the radio wave for the LTE, it is possible to secure a wide range of areas capable of transmission and reception, with a radius of several hundred meters to several kilometers.

Further, in the wearable camera 11, one of the two wireless communication units performs a narrow-area wireless communication using a wireless LAN or a short-range wireless communication standard between the wearable camera 11 and a police vehicle (for example, a patrol car) located within a predetermined communication range. Data acquired by the imaging unit 47 or the MCU 131 housed in the upper housing 35 is sent to the police vehicle PV by a wireless communication using the wireless LAN.

In the wearable camera 11, the wearable camera 11 is mounted to or held in a uniform of a police officer as an example of a user. The wearable camera 11 images a situation around (for example, the front) the police officer as a subject, and transmits the data obtained by the imaging to the in-vehicle camera system 109 via the in-vehicle PC 111 and the like via a wireless LAN.

BLE and WLAN that perform the wireless LAN can be mounted on a printed circuit board housed in the upper housing 35 as a one-chip device. In this case, the wearable camera 11 can store data in the in-vehicle recorder 117. Further, the wearable camera 11 can start image capturing concurrently with the in-vehicle camera system 109 and also store the obtained data in the in-vehicle recorder 117 together.

Further, in the wearable camera 11, one of the two wireless communication units performs s wide-area wireless communication between the wearable camera 11 and a server (for example, a back-end server) in a police station located in a predetermined communication cell. Data acquired by the imaging unit 47 or the MCU 131 housed in the upper housing 35 is sent to a police station server (for example, a back-end server) via the wide-area wireless communication such as the LTE.

In the wearable camera 11, the wearable camera 11 directly transmits data obtained by imaging to the mobile network via the LTE.

In the LTE, a device is mounted on a dedicated printed circuit board added as an option in the upper housing 35. In this case, the wearable camera 11 can directly send data to, for example, the back-end server 105 in the police station PD via the mobile network for storage. The wearable camera 11 can also stream data to the back-end client 107 via the mobile network.

Further, the wide-area wireless communication is a wireless communication conforming to the LTE communication standard.

Thereby, the wearable camera 11 can perform the wide-area wireless communication such as the LTE, and thus, even if a police officer is located at a location considerably spaced apart from the police station, if a distance to the location is within an LTE communication range, video data imaged at the site of a patrol, an incident, or the like can be directly transmitted to a server (for example, a back-end server) in the police station.

Next, a first modification example of the wearable camera 11 according to the first embodiment will be described.

Figure 16:
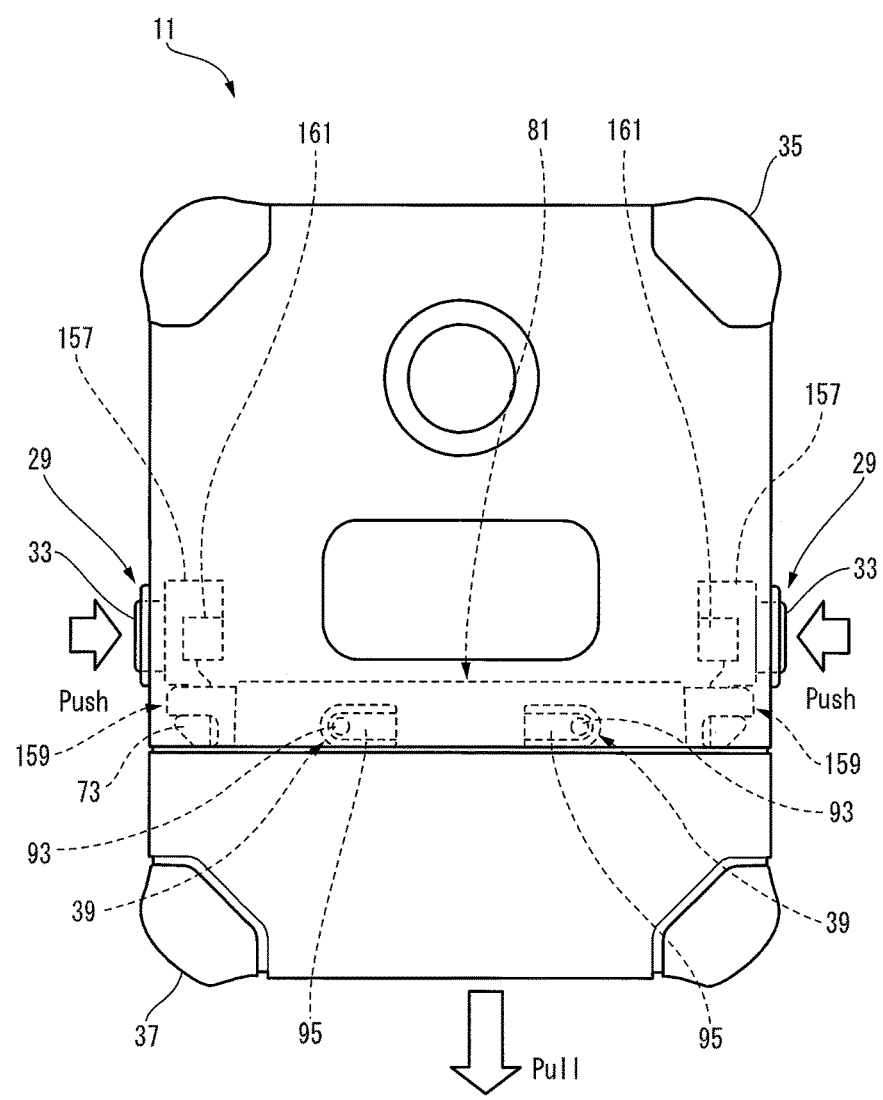
FIG. 16 is a front view illustrating a first modification example of main locking portions of the wearable camera.

FIG. 16 is a front view illustrating a first modification example of the main locking portions 29 in the wearable camera 11.

In the wearable camera 11 according to the first modification example, a point that a locking portion is configured with a double locking mechanism of the temporary locking portion 39 and the main locking portion 29 is the same as the configuration according to the first embodiment described above. A different point is that the main locking portion 29 is configured with a main locking hook 157 and a claw locking portion 159. The temporary locking portion 39 has the same configuration as configuration according to the first embodiment described above.

That is, the locking portion is configured with the main locking portion 29 and the temporary locking portion 39 and can be locked by a double locking mechanism. Even if the main locking hook 157 of the main locking portion 29 is swung, if the temporary locking portion 39 is not released, the lower housing 37 is held in a state of being attached to the upper housing 35.

Figure 17:
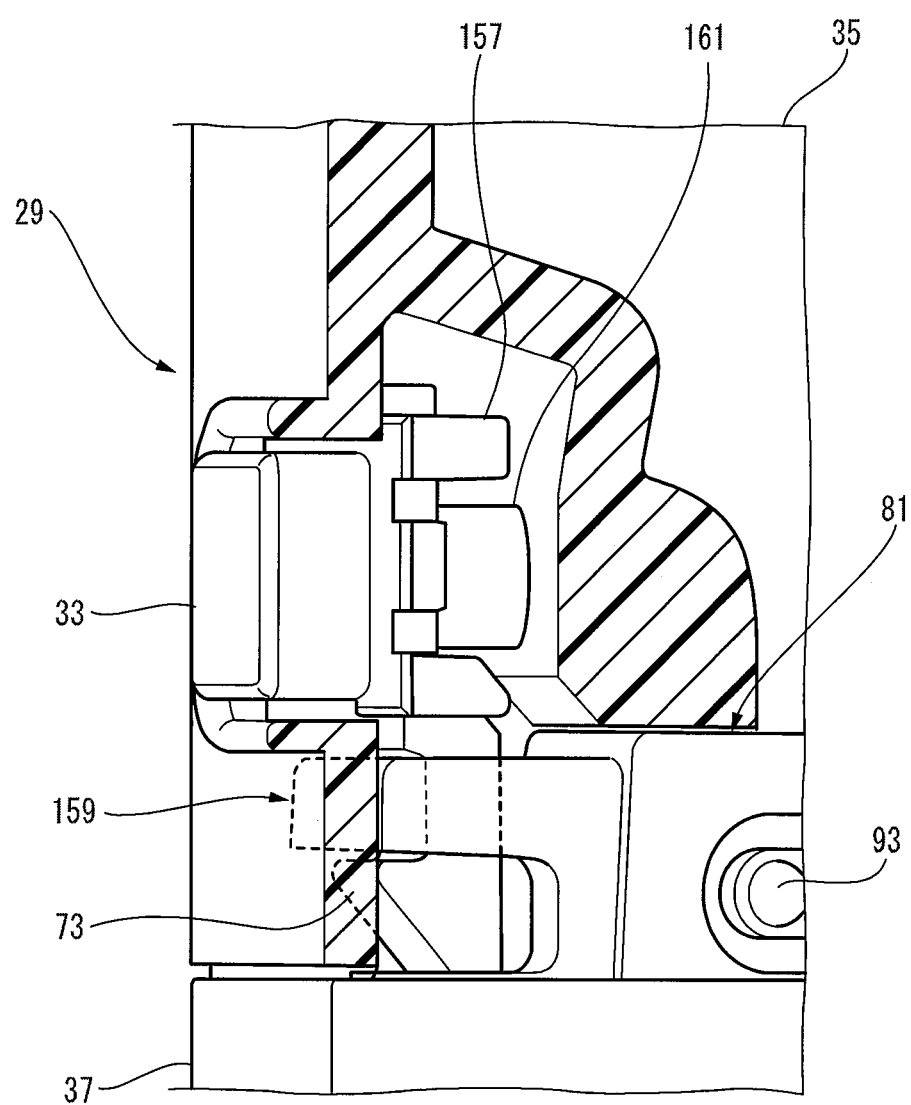
FIG. 17 is an enlarged perspective view of the right main locking portion illustrated in FIG. 16.

FIG. 17 is an enlarged perspective view of the right main locking portion 29 illustrated in FIG. 16.

In the wearable camera 11, the push projection portion 33 is formed on an upper outer surface of the main locking hook 157. On a lower outer surface of the main locking hook 157, the hook claw 73 protrudes toward the outside of the housing. As illustrated in FIG. 16, the left and right main locking hooks 157 with the hook claws 73 protruding toward a lower outer surface have an inverted L shape and an L shape in front view. The main locking hook 157 is provided on each of the left and right side surfaces of the upper housing 35 so as to be movable in parallel in a direction perpendicular to the side surfaces. Thereby, in the main locking hook 157, the hook claws 73 at a lower end are moved inwards in parallel by pushing push projection portions 33 on an upper outer surface.

A coil spring 161 is interposed between a side surface of the upper housing 35 and the main locking hook 157. The coil spring 161 is disposed in an elastically deformed state, thereby, applying an urging force to the main locking hook 157 in a direction in which the hook claw 73 is moved in parallel from the upper housing 35 to the outside. Thus, in the main locking hook 157 in which the push projection portion 33 is pushed by a finger, the hook claw 73 is moved inwards, but if the finger is released, the hook claw 73 is moved outward in parallel again by the urging force of the coil spring 161.

Figure 18:
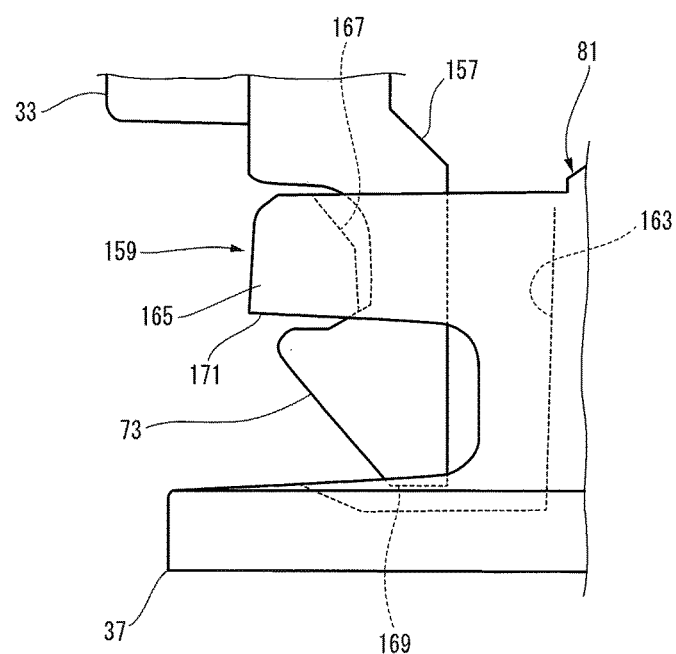
FIG. 18 is an enlarged front view of main parts of a main locking hook and a claw locking portion illustrated in FIG. 17.

FIG. 18 is an enlarged front view of main parts of the main locking hook 157 and the claw locking portion 159 illustrated in FIG. 17.

The block portion 81 that fits on the lower surface of the upper housing 35 protrudes on the upper surface of the lower housing 37. The claw locking portions 159 are formed to protrude on the left and right sides of the block portion 81. The claw locking portion 159 is formed in a square frame shape, and the main locking hook 157 is inserted into an inner hole 163. An inclined surface 167 for guiding the main locking hook 157 to the inner hole 163 is formed in an upper surface of an outer frame portion 165 of the claw locking portion 159. An insertion tip portion 169 of the main locking hook 157 is in contact with the inclined surface 167. In the main locking hook 157 inserted into the inner hole 163, the hook claw 73 is locked to a frame lower surface 171 of the outer frame portion 165. Thereby, the main locking hook 157 is securely locked to the lower housing 37. Then, as illustrated in FIG. 16, in the main locking hook 157, the hook claws 73 at the lower end are moved inwards in parallel by simultaneously pushing the push projection portions 33 on the upper outer surface, and thereby, the lower housing 37 is unlocked from the claw locking portions 159. In this state, the lower housing 37 is pulled downward by a predetermined force, and thereby, the temporary locking due to the temporary locking portion 39 is released and the lower housing 37 can be detached from the upper housing 35. Further, the lower housing 37 is attached by pushing the block portion 81 of the lower housing 37 into the peripheral groove 91 opened in the lower surface of the upper housing 35, and thereby, the main locking hooks 157 and the temporary locking protrusions 93 are simultaneously locked to couple the lower housing to the upper housing 35.

The wearable camera 11 includes a pair of main locking hooks 157 which are provided on the left and right side surfaces of the upper housing 35 respectively in a direction perpendicular to the side surface so as to be movable in parallel, and in which, as push projection portions 33 on an upper outer surface are simultaneously pushed, hook claws 73 at a lower end are moved inwards in parallel to unlock the lower housing 37 from the claw locking portions 159.

In the wearable camera 11, the main locking hook 157 is provided on each of the left and right side surfaces of the upper housing 35 so as to be movable in parallel in a direction perpendicular to the side surfaces. In the main locking hook 157, as the push projection portions 33 exposed on the left and right side surfaces of the upper housing 35 are simultaneously pushed, the hook claws 73 at the lower end are moved inwards in parallel, and thereby, the lower housing 37 is unlocked from the claw locking portions 83. In a pair of the left and right main locking hooks 157, even if only one of the right and left push projection portions 33 is pushed, the hook claw 73 of the other main locking hook 157 remains in the locking state, and thereby, the main locking state is not released. Thus, if the pair of main locking hooks 157 are not operated simultaneously, the wearable camera 11 cannot release the main locking and prevents the main locking from being released due to an erroneous operation such as inadvertent push of one of the main locking hooks 157.

Further, if the push projection portions 33 are pushed, the main locking hooks 157 move in parallel toward an inside in which the hook claws 73 are in the same direction and are released from locking, and thereby, a lower end of the main locking hook 157 is not displaced in a direction in which the main locking hook protrudes from a side surface of the upper housing 35 unlike a swinging mechanism in which a swing tip circularly moves around the center of rotation. Accordingly, the main locking hook 157 can suppress occurrence of a hindrance to unlocking due to foreign matters interfering with the outside of the hook claw 73. For example, locking can be released without any trouble even in the inside of the clothes such as the inside of a pocket.

Next, a second modification example of the wearable camera 11 according to the first embodiment will be described. The wearable camera 11 according to the second modification example can selectively couple the lower housing 37 of a different type (not illustrated) to the upper housing 35. The lower housing 37 is, for example, a lower housing 37 of a large capacity type that houses a battery 59 of a large capacity (for example, twice a charging capacity) compared to a standard lower housing 37 that houses the battery 59 of a standard capacity. Further, the lower housings 37 of a different type may be the lower housing 37 of a cold region type in which a heater and a heat insulating material are provided. Furthermore, the lower housing 37 of a different type may be the lower housing 37 of a bulletproof type having an explosion-proof property that can suppress explosion even when shot with a gun.

Further, in the wearable camera 11, a lower housing 37 of a different type is capable of being selectively coupled to the upper housing 35.

In the wearable camera 11 according to the second modification example, each of the lower housings 37 of various different types includes the main locking portion 29 and the temporary locking portion 39 in the same manner as the standard lower housing 37. Thereby, the wearable camera 11 can couple anything in the inside of each of the lower housings 37 of various types to the upper housing 35 with compatibility. Further, the wearable camera 11 includes the same main locking portion 29 and the temporary locking portion 39, and thus, even when series development is made, the wearable camera 11 can absorb differences in a shape and a size of a container on the housing side. Thereby, for example, a risk (a design change or the like) that occurs at the time of battery procurement, which is a problem for each new development, can be absorbed by the generalized lower housing 37 and easily avoided.

Although various embodiments are described above with reference to the drawings, it goes without saying that the present disclosure is not limited to the embodiments. It is obvious for those skilled in the art that various modifications, changes, substitutions, additions, deletions, and equivalents can be performed within the scope of the claims, and of course, it is understood that those belong to the technical scope of the present disclosure. Further, configuration elements in the various embodiments described above may be randomly combined without departing from the spirit of the invention.

INDUSTRIAL APPLICABILITY

The present disclosure is useful as a wearable camera which can avoid non-usage of a user based on restrictions on charging of a battery built in a housing and can improve usability of the user.

The present application is based upon Japanese Patent Application (Patent Application No. 2019-122356) filed on Jun. 28, 2019, the contents of which are incorporated herein by reference.

What is claimed is:
1. A wearable camera comprising:
a capturing portion configured to capture a subject around a user;
a first control portion configured to control capturing processing of the capturing portion, and control charging processing of a battery;
an upper housing that is mountable to the user and accommodates the capturing portion and the first control portion; and
a lower housing that accommodates the battery and is detachably attached to the upper housing,
wherein the lower housing includes outer contact terminals that are exposed to an outside and positioned on a first side of the lower housing, and inner contact terminals that are positioned on a second side of the lower housing that is opposite to the first side,
in a state where the lower housing is connected to a charging stand via the outer contact terminals and is attached to the upper housing, the battery is charged by the charging stand via the outer contact terminals,
in a state where the lower housing is disconnected from the charging stand and is attached to the upper housing, the battery supplies power to the capturing portion and the first control portion via a first set of terminals of the inner contact terminals, and
the first control portion monitors and controls a charging status of the battery via a second set of terminals of the inner contact terminals, and
in a state where the lower housing is connected to the charging stand via the inner contact terminals and is detached from the upper housing, the battery is charged by the charging stand via the first set of terminals, and a second control portion in the charging stand monitors and controls the charging status of the battery via the second set of terminals.

2. The wearable camera according to claim 1, wherein the inner contact terminals includes a greater number of terminals than the outer contact terminals.

3. The wearable camera according to claim 1, wherein the upper housing and the lower housing are double-locked by a temporary locking portion and a main locking portion that performs main locking after temporary locking is performed by the temporary locking portion.

4. The wearable camera according to claim 1, further comprising:

a pair of main locking hooks which are provided on left and right side surfaces of the upper housing respectively so as to be swingable, wherein when projection portions on upper outer surfaces of the upper housing and the pair of main locking hooks are simultaneously pushed, hook claws at a lower end of the upper housing are swung toward an outside to unlock the lower housing from claw locking portions of the lower housing.

5. The wearable camera according to claim 1, further comprising:

a pair of main locking hooks which are provided on left and right side surfaces of the upper housing respectively so as to be movable in parallel with a direction perpendicular to the side surfaces, wherein when projection portions on upper outer surfaces of the upper housing and the pair of main locking hooks are simultaneously pushed, hook claws at a lower end of the upper housing are moved inwards in parallel with the direction to unlock the lower housing from claw locking portions of the lower housing.

6. The wearable camera according to claim 1, wherein the upper housing accommodates two wireless communication portions.

7. The wearable camera according to claim 6, wherein one of the two wireless communication portions performs a narrow-area wireless communication using a wireless LAN or a short-range wireless communication standard between the wearable camera and a police vehicle located within a predetermined communication range; and wherein data acquired by the capturing portion or the first control portion accommodated in the upper housing is sent to the police vehicle via a wireless communication using the wireless LAN.

8. The wearable camera according to claim 6, wherein one of the two wireless communication portions performs a wide-area wireless communication between the wearable camera and a server in a police station located in a predetermined communication cell; and wherein data acquired by the capturing portion or the control portion accommodated in the upper housing is sent to the server through the wide-area wireless communication.

9. The wearable camera according to claim 8, wherein the wide-area wireless communication is a wireless communication conforming to an LTE communication standard.

10. The wearable camera according to claim 1, wherein a lower housing of a different type is capable of being selectively coupled to the upper housing.

11. The wearable camera according to claim 1 wherein, in the state where the lower housing is connected to the charging stand via the inner contact terminals and is detached from the upper housing, the lower housing is inserted into a hole that extends into an upper surface of the charging stand.

* * * * *